United States Patent
Asghari et al.

(10) Patent No.: US 11,681,021 B2
(45) Date of Patent: Jun. 20, 2023

(54) OPTICAL SENSOR SYSTEM

(71) Applicant: SiLC Technologies, Inc., Monrovia, CA (US)

(72) Inventors: Mehdi Asghari, La Canada Flintridge, CA (US); Bradley Jonathan Luff, La Canada Flintridge, CA (US)

(73) Assignee: SiLC Technologies. Inc., Monrovia, CA (US)

( * ) Notice: Subject to any disclaimer, the term of this patent is extended or adjusted under 35 U.S.C. 154(b) by 1074 days.

(21) Appl. No.: 16/299,095

(22) Filed: Mar. 11, 2019

(65) Prior Publication Data

US 2020/0057143 A1 Feb. 20, 2020

Related U.S. Application Data

(60) Provisional application No. 62/719,381, filed on Aug. 17, 2018.

(51) Int. Cl.
G01C 3/08 (2006.01)
G01S 7/486 (2020.01)
G01S 17/89 (2020.01)

(52) U.S. Cl.
CPC .............. *G01S 7/486* (2013.01); *G01S 17/89* (2013.01)

(58) Field of Classification Search
CPC ........ G01S 7/486; G01S 17/89; G01S 7/4812; G01S 7/4817; G01S 7/4918; G01S 17/34; G01S 17/58; G01S 7/4818
See application file for complete search history.

(56) References Cited

U.S. PATENT DOCUMENTS

| | | | |
|---|---|---|---|
| 9,157,790 B2 | 10/2015 | Shpunt | |
| 9,753,351 B2 | 9/2017 | Eldada | |
| 9,841,495 B2 | 12/2017 | Campbell | |
| 10,094,916 B1 * | 10/2018 | Droz | ...................... G02B 27/62 |
| 10,222,474 B1 * | 3/2019 | Raring | .................. H01S 5/0085 |
| 10,345,447 B1 * | 7/2019 | Hicks | .................... G01S 7/4863 |
| 2017/0098917 A1 * | 4/2017 | Popovic | ............... H04B 10/572 |

OTHER PUBLICATIONS

PI Motion/Positioning, 2018, Retrieved from PI USA: http://www.pi-usa.us/products/PDF_Data/Q-522_Mini_Positioning_Stage_20150203.pdf.
Fast Tip/Tilt Platform, 2018, Retrieved from PI USA Active Optics: http://www.pi-usa.us/products/PDF_Data/S335_Fast_Tip-Tilt_Platform.pdf.
Baghmisheh, B.B., Chip-Scale Lidar, 2017, University of California, Berkeley.

(Continued)

*Primary Examiner* — Samantha K Nickerson
(74) *Attorney, Agent, or Firm* — Gavrilovich, Dodd & Lindsey LLP

(57) ABSTRACT

A LIDAR system includes an emitter head configured to receive LIDAR output signals from one or more LIDAR chips and to output head output signals that each includes light from one of the LIDAR output signals. The emitter head is movable relative to the one or more LIDAR chips. The one or more LIDAR chips are configured to receive LIDAR input signals that each includes light from one of the head output signals. The LIDAR input signals include LIDAR data indicating the distance and/or radial velocity between a LIDAR chip and an object.

20 Claims, 11 Drawing Sheets

(56) References Cited

OTHER PUBLICATIONS

Issakov, V., Radar Systems, Ch. 2, In Microwave Circuits for 24GHz Automotive Radar in Silicon-Based Technologies, Berlin Heidelberg: Springer-Verlag, 2010.
Li, L., "Time-of-Flight Camera—An Introduction", Texas Instruments White Paper SLOA190B, 2014.
Velodyne, "HDL-64E S2 Datasheet", 2017, Retrieved from http://velodynelidar.com/lidar/products/brochure/HDL-64E%20S2%20datasheet_2010_lowres.pdf.

* cited by examiner

OPTICAL SENSOR SYSTEM

RELATED APPLICATIONS

This Patent Application claims the benefit of U.S. Patent Application Ser. No. 62/719,381, filed on Aug. 17, 2018, entitled "Optical Sensor System" and incorporated herein in its entirety.

FIELD

The invention relates to optical devices. In particular, the invention relates to LIDAR chips.

BACKGROUND

There is an increasing commercial demand for 3D sensing systems that can be economically deployed in applications such as ADAS (Advanced Driver Assistance Systems) and AR (Augmented Reality). LIDAR (Light Detection and Ranging) sensors are used to construct a 3D image of a target scene by illuminating the scene with a LIDAR output signal and measuring the reflected light signal (LIDAR input signal).

Frequency Modulated Continuous Wave (FMCW) is an example of a coherent detection method can be used for LIDAR applications. The FMCW technique is capable of determining both distance and velocity of an object with a single measurement. Additionally, FMCW techniques have reduced sensitivity to ambient light and light from other LIDAR systems.

An integrated FMCW LIDAR chip is not yet available. Efforts to generate LIDAR chips that have a portion of the LIDAR chip components have been limited in the amount of optical power they can transmit without signal degradation. This signal degradation limits the amount of transmitted laser power to the reflecting object. This limit to the amount of transmitted laser power limits overall sensitivity of the device. For these reasons, there is a need for a platform capable of integrating the LIDAR chip while also providing the optical power needed to achieve the desired sensitivity levels.

An additional challenge to the adoption of integrated LIDAR chips is the need to scan the LIDAR signal output (LIDAR output signal) from the LIDAR chip across a field of view. During the scan, LIDAR data is generated for multiple different sample regions within the field of view. The LIDAR data is generated for each sample region.

The scan can be a continuous scan where the LIDAR output signal moves continuously within sample region. More specifically, the LIDAR output signal moves while the LIDAR output signal illuminates a sample region.

When the LIDAR output signal and the resulting LIDAR input signal travel the same optical path between a reflecting object and the LIDAR chip, continuous scanning at higher speeds fails as the desired range increases. This occurs because the time for the LIDAR output signal to reach the reflecting object and for the resulting LIDAR input signal to return to the LIDAR chip becomes large enough that the additional scanning that occurs during this time reduces the successful receipt of the LIDAR input signal by the LIDAR chip.

For these reasons, there is a need for an improved LIDAR system.

SUMMARY

A LIDAR system includes an emitter head configured to receive LIDAR output signals from one or more LIDAR chips and to output head output signals that each includes light from one of the LIDAR output signals. The emitter head is movable relative to the one or more LIDAR chips. The one or more LIDAR chips are configured to receive LIDAR input signals that each includes light from one of the head output signals. The LIDAR input signals include LIDAR data indicating the distance and/or radial velocity between a LIDAR chip and an object.

BRIEF DESCRIPTION OF THE FIGURES

FIG. 10A is a topview of the emitter head.

FIG. 10B is a sideview of the emitter head illustrated in FIG. 10A.

FIG. 10C is a sideview of the emitter head.

FIG. 10D is a topview of the emitter head shown in FIG. 10C.

FIG. 11A illustrates the deflection angle provided by a beam steering mechanism to a single head output signal as a function of time.

FIG. 11B illustrates the field of view associated with the scan shown in FIG. 11A.

FIG. 11C illustrates the deflection angle provided by a beam steering mechanism to a single head output signal as a function of time.

FIG. 11D illustrates the field of view associated with the scan shown in FIG. 11C.

FIG. 11E illustrates the deflection angle provided by a beam steering mechanism to a single head output signal as a function of time.

FIG. 11F illustrates the field of view associated with the scan shown in FIG. 11E.

DESCRIPTION

Figure 1:
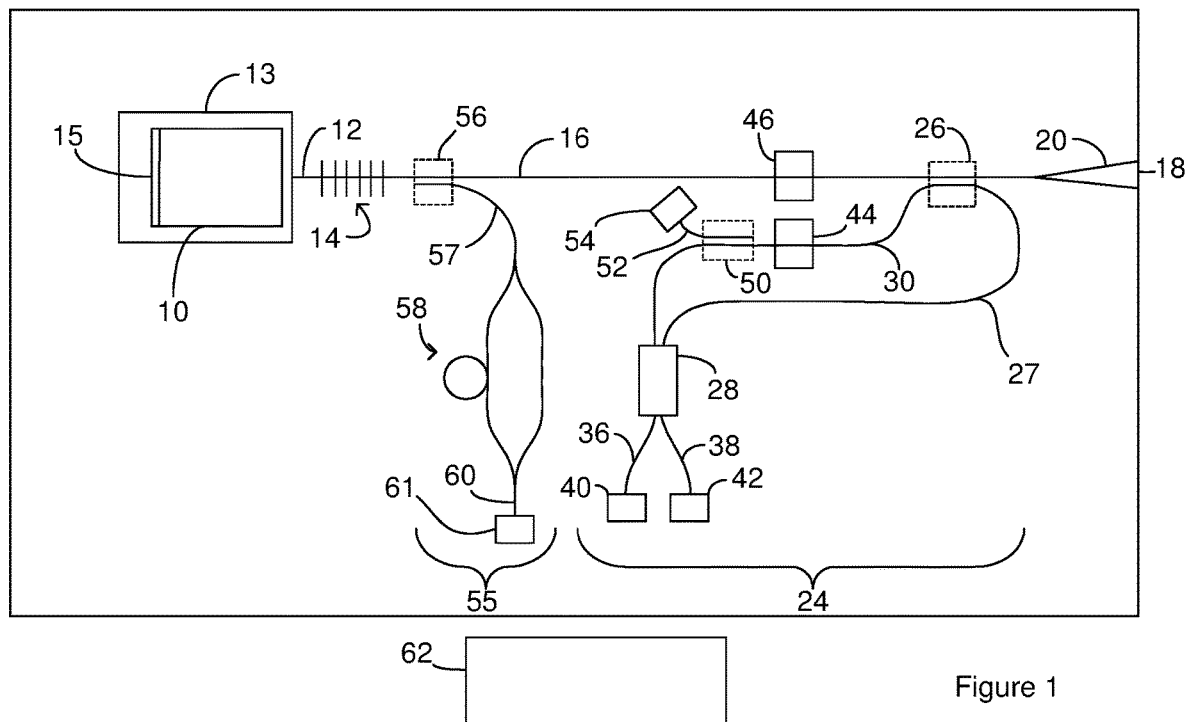
FIG. 1 is a top view of a LIDAR chip.

A LIDAR system includes an emitter head configured to receive LIDAR output signals from one or more LIDAR chips and to output head output signals that each includes light from one of the LIDAR output signals. The head output signals are reflected by an object. The reflected head output signals serve as LIDAR input signals that are also received by the emitter head. The LIDAR input signals received by the emitter head are guided to the one or more LIDAR chips for processing. The emitter head is movable relative to the one or more LIDAR chips. As a result, the emitter head can provide scanning of multiple head output signals within a field of view. The ability to scan multiple head output signals reduces the scanning speed that is needed for a continuous scan. The reduction in scanning speed can reduce the loss of the LIDAR input signals by the LIDAR chips. Additionally or alternately, ability to scan multiple head output signals can reduce the required scanning speed enough to permit step scanning where the location of the head output signals within a sample region on the field of view stays constant for all or a portion of the time needed to generate the optical signals that carry the LIDAR data. As a result, loss of the LIDAR input signals by the LIDAR chips is reduced.

Additionally, a LIDAR chip is disclosed that integrates LIDAR functionality onto a single optical chip. The chip also provides optical components for monitoring and controlling the optical functionality of the chip. For instance, the chip includes optical components for controlling the frequency and intensity of the outgoing LIDAR signal transmitted from the chip. The chip also includes optical components for controlling the intensity of the LIDAR input light signal received by the chip after being reflected by an off-chip object.

The chip is suitable for construction on a variety of platforms such as the silicon-on-insulator (SOI) platform. The chip can include multiple waveguides; however, the waveguide dimensions are increased above the dimensions of standard silicon photonics LIDAR approaches in order to make these chip constructions suitable for LIDAR applications. A LIDAR chip transmits a LIDAR output light signal which is reflected by an object located off the chip. A portion of the reflected light signal is received by the LIDAR chip. As a result of this mechanism, the power of the reflected light signal that is actually available to the LIDAR chip for processing can be undesirably low.

The waveguide dimensions that are generally used with LIDAR chips constructed from SOI-type platforms are often a source of optical power and phase information loss that makes these chips difficult or even impossible to apply to LIDAR applications. However, the inventors have found that increasing the waveguide dimensions while maintaining a single-mode configuration allows these LIDAR chips to be successfully applied to LIDAR applications. For instance, the chip can include ridge waveguides that each includes a ridge of a light-transmitting medium such as silicon extending from slab regions of the light-transmitting medium. Constructing the ridge waveguides such that the ridge has a width greater than 1 µm and less than 4 µm, a height greater than 1 µm and less than 4 µm and extends away from slab regions with a thickness greater than 0.0 µm and less than 3 µm allows the chip to be successfully used for LIDAR applications.

FIG. 1 is a topview of a LIDAR chip that includes a laser cavity. The laser cavity includes a light source 10 that can include or consist of a gain medium (not shown) for a laser. The chip also includes a cavity waveguide 12 that receives a light signal from the light source 10. The light source can be positioned in a recess 13 so a facet of the light source is optically aligned with a facet of the cavity waveguide 12 to allow the light source and cavity waveguide 12 to exchange light signals. The cavity waveguide 12 carries the light signal to a partial return device 14. The illustrated partial return device 14 is an optical grating such as a Bragg grating. However, other partial return devices 14 can be used; for instance, mirrors can be used in conjunction with echelle gratings and arrayed waveguide gratings.

The partial return device 14 returns a return portion of the light signal to the cavity waveguide 12 as a return signal. For instance, the cavity waveguide 12 returns the return signal to the light source 10 such that the return portion of the light signal travels through the gain medium. The light source 10 is configured such that at least a portion of the return signal is added to the light signal that is received at the cavity waveguide 12. For instance, the light source 10 can include a highly, fully, or partially reflective device 15 that reflects the return signal received from the gain medium back into the gain medium. As a result, light can resonate between the partial return device 14 and the reflective device 15 so as to form a Distributed Bragg Reflector (DBR) laser cavity. A DBR laser cavity has an inherently narrow-linewidth and a longer coherence length than DFB lasers and accordingly improves performance when an object reflecting the LIDAR output signal from the chip is located further away from the chip.

The partial return device 14 passes a portion of the light signal received from the cavity waveguide 12 to a utility waveguide 16 included on the chip. The portion of the light signal that the utility waveguide 16 receives from the partial return device 14 serves as the output of the laser cavity. The output of the laser cavity serves as an outgoing LIDAR signal on the utility waveguide 16. The utility waveguide 16 terminates at a facet 18 and carries the outgoing LIDAR signal to the facet 18. The facet 18 can be positioned such that the outgoing LIDAR signal traveling through the facet 18 exits the chip and serves as a LIDAR output signal. For instance, the facet 18 can be positioned at an edge of the chip so the outgoing LIDAR signal traveling through the facet 18 exits the chip and serves as a LIDAR output signal that includes or consists of light from the outgoing LIDAR signal.

The LIDAR output signal travels away from the chip and is reflected by objects in the path of the LIDAR signal. The reflected signal travels away from the objects. At least a portion of the reflected signal returns to the facet 18 of the utility waveguide 16 and serves as a LIDAR input signal. The LIDAR chip is configured to receive the LIDAR input signal through the facet 18. The portion of the LIDAR input signal that enters the utility waveguide 16 through the facet 18 serve as an incoming LIDAR signal that is guided by the utility waveguide 16. Accordingly, the incoming LIDAR signal includes or consists of light from the LIDAR input signal, the LIDAR output signal, and the outgoing LIDAR signal.

The utility waveguide 16 can include a tapered portion before the facet 18. For instance, the utility waveguide 16 can include a taper 20 that terminate at the facet 18. The taper 20 can relax the alignment tolerances required for efficient coupling of the utility waveguide 16 to the LIDAR input signal and the outgoing LIDAR signal. Accordingly, the taper 20 can increase the percentage of the LIDAR input signal that is successfully returned to the chip for processing. In some instances, the taper 20 is constructed such that the facet 18 has an area that is more than two, five, or ten times the area of a cross section of a straight portion of the utility waveguide 16. Although FIG. 1 shows the taper 20 as a horizontal taper, the taper 20 can be a horizontal and/or vertical taper. The horizontal and/or vertical taper can be linear and/or curved. In some instances, the taper 20 is an adiabatic taper.

The chip includes a data branch 24 where LIDAR data (the distance and/or radial velocity between a LIDAR chip and an object) is added to optical signals. The data branch includes an optical coupler 26 that moves a portion of the light signals from the utility waveguide 16 into the data branch. For instance, an optical coupler 26 couples a portion of the outgoing LIDAR signal from the utility waveguide 16 onto a reference waveguide 27 as a reference signal. The reference waveguide 27 carries the reference signal to a light-combining component 28.

The optical coupler 26 also couples a portion of the incoming LIDAR signal from the utility waveguide 16 onto a comparative waveguide 30 as a comparative signal. As a result, the comparative signal includes or consists of at least a portion of the light from the incoming LIDAR signal. The comparative signal can exclude light from the reference light signal. The comparative waveguide 30 carries the comparative signal to the light-combining component 28.

The illustrated optical coupler 26 is a result of positioning the utility waveguide 16 sufficiently close to the reference waveguide 27 and the comparative waveguide 30 that light from the utility waveguide 16 is coupled into the reference waveguide 27 and the comparative waveguide 30; however, other signal tapping components can be used to move a portion of the of the light signals from the utility waveguide 16 onto the reference waveguide 27 and the comparative waveguide 30. Examples of suitable signal tapping components include, but are not limited to, y-junctions, multi-mode interference couplers (MMIs), and integrated optical circulators.

The light-combining component 28 combines the comparative signal and the reference signal into a composite signal. The reference signal includes light from the outgoing LIDAR signal. For instance, the reference signal can serve as a sample of the outgoing LIDAR signal. The reference signal can exclude light from the LIDAR output signal, the LIDAR input signal and the incoming LIDAR signal. In contrast, the comparative signal includes or consists of at least a portion of the light from the incoming LIDAR signal, the LIDAR input signal, the LIDAR output signal, and the outgoing LIDAR signal. Additionally, the comparative signal can exclude light from the reference light signal. As a result, the comparative signal can serve as a sample of the LIDAR input signal and/or of the incoming LIDAR signal. Accordingly, the comparative signal has been reflected by an object located off of the chip while the reference signal has not been reflected. When the chip and the reflecting object are moving relative to one another, the comparative signal and the reference signal have different frequencies due to the Doppler effect. As a result, beating occurs between the comparative signal and the reference signal.

The resulting composite sample signal is received at a light sensor. For instance, in the LIDAR system of FIG. 1, the light-combining component 28 also splits the resulting composite sample signal onto a first detector waveguide 36 and a second detector waveguide 38. The first detector waveguide 36 carries a first portion of the composite sample signal to a first light sensor 40 that converts the first portion of the composite sample signal to a first electrical signal. The second detector waveguide 38 carries a second portion of the composite sample signal to a second light sensor 42 that converts the second portion of the composite sample signal to a second electrical signal. Examples of suitable light sensors include germanium photodiodes (PDs), and avalanche photodiodes (APDs).

The light combining component 28, the first light sensor 40 and the second light sensor 42 can be connected as a balanced photodetector that outputs an electrical data signal. For instance, the light combining component 28, the first light sensor 40 and the second light sensor 42 can be connected such that the DC components of the signal photocurrents cancel, improving detection sensitivity. Suitable methods for connecting the first light sensor 40 and the second light sensor 42 as balanced photodetectors includes connecting the first light sensor 40 and the second light sensor 42 in series. In one example, the first light sensor 40 and the second light sensor 42 are both avalanche photodiodes connected in series. Balanced photodetection is desirable for detection of small signal fluctuations.

An example of a suitable light-combining component 28 is a Multi-Mode Interference (MMI) device such as a 2×2 MMI device. Other suitable light-combining components 28 include, but are not limited to, adiabatic splitters, and directional coupler. In some instances, the functions of the illustrated light-combining component 28 are performed by more than one optical component or a combination of optical components.

A single light sensor can replace the first light sensor 40 and the second light sensor 42 and can output the data signal. When a single light sensor replaces the first light sensor 40 and the second light sensor 42, the light-combining component 28 need not include light-splitting functionality. As a result, the illustrated light light-combining component 28 can be a 2×1 light-combining component rather than the illustrated 2×2 light-combining component. For instance, the illustrated light light-combining component can be a 2×1 MMI device. In these instances, the chip includes a single detector waveguide that carries the composite sample signal to the light sensor.

The data branch includes a data optical attenuator 44 positioned along the comparative waveguide 30 such that the data optical attenuator 44 can be operated so as to attenuate the comparative signal on the comparative waveguide 30. The chip also includes an output optical attenuator 46 positioned along the utility waveguide 16 such that the output optical attenuator 46 can be operated so as to attenuate the outgoing LIDAR signal on the utility waveguide 16. Suitable attenuators for the data optical attenuator 44 and/or the output optical attenuator 46 are configured to attenuate intensity of a light signal. Examples of a suitable attenuator configured to attenuate intensity of a light signal include carrier-injection based PIN diodes, electro-absorption modulators, and Mach-Zehnder (MZ) modulators.

The chip also includes a sampling directional coupler 50 that couples a portion of the comparative signal from the comparative waveguide 30 onto a sampling waveguide 52. The coupled portion of the comparative signal serves as a sampling signal. The sampling waveguide 52 carries the sampling signal to a sampling light sensor 54. Although FIG. 1 illustrates a sampling directional coupler 50 moving a portion of the comparative signal onto the sampling waveguide 52, other signal tapping components can be used to move a portion of the comparative signal from the comparative waveguide 30 onto the sampling waveguide 52. Examples of suitable signal tapping components include, but are not limited to, y-junctions, and MMIs.

The chip includes a control branch 55 for controlling operation of the laser cavity. The control branch includes a directional coupler 56 that moves a portion of the outgoing LIDAR signal from the utility waveguide 16 onto a control waveguide 57. The coupled portion of the outgoing LIDAR signal serves as a tapped signal. Although FIG. 1 illustrates a directional coupler 56 moving portion of the outgoing LIDAR signal onto the control waveguide 57, other signal-tapping components can be used to move a portion of the outgoing LIDAR signal from the utility waveguide 16 onto the control waveguide 57. Examples of suitable signal tapping components include, but are not limited to, y-junctions, and MMIs.

The control waveguide 57 carries the tapped signal to an interferometer 58 that splits the tapped signal and then re-combines the different portions of the tapped signal with a phase differential between the portions of the tapped signal. The illustrated interferometer 58 is a Mach-Zehnder interferometer; however, other interferometers can be used.

The interferometer 58 outputs a control light signal on an interferometer waveguide 60. The interferometer waveguide 60 carries the control light signal to a control light sensor 61 that converts the control light signal to an electrical signal that serves as an electrical control signal. The interferometer signal has an intensity that is a function of the frequency of the outgoing LIDAR signal. For instance, a Mach-Zehnder interferometer will output a sinusoidal control light signal with a fringe pattern. Changes to the frequency of the outgoing lidar signal will cause changes to the frequency of the control light signal. Accordingly, the frequency of the electrical control signal output from the control light sensor 61 is a function of the change in frequency of the outgoing lidar signal. Other detection mechanisms can be used in place of the control light sensor 61. For instance, the control light sensor 61 can be replaced with a balanced photodetector arranged as the light combining component 28, the first light sensor 40 and the second light sensor 42.

Electronics 62 can operate one or more components on the chip. For instance, the electronics 62 can be in electrical communication with and control operation of the light source 10, the data optical attenuator 44, output optical attenuator 46, the first light sensor 40, the second light sensor 42, the sampling light sensor 54, and the control light sensor 61. Although the electronics 62 are shown off the chip, all or a portion of the electronics can be included on the chip. For instance, the chip can include electrical conductors that connect the first light sensor 40 in series with the second light sensor 42.

During operation of the chip, the electronics 62 operate the light source 10 such that the laser cavity outputs the outgoing LIDAR signal. The electronics 62 then operate the chip through a series of cycles. In some instances, each cycle corresponds to a sample region in a field of view. For instance, the LIDAR system can be configured to steer the LIDAR output signal to different sample regions in the field of view and to generate the LIDAR data for all or a portion of the sample regions.

The cycles can include one or more different time periods. In some instances, different periods are associated with a different waveform for the outgoing LIDAR signal. For instance, the electronics can add chirp to the frequency of the outgoing LIDAR signal and accordingly to the LIDAR output signal(s). The chirp can be different during adjacent periods in a cycle. For instance, the cycles can include one, two, three, or three or more periods that are each selected from a group consisting of a period where the frequency of the outgoing light signal is increased during the period, the frequency of the outgoing light signal is decreased during the period, and the frequency of the outgoing light signal is held constant during the period. In some instances, the increase or decrease in the frequency during a period is a linear function of time. In some instances, the periods are configured such that the waveform of the outgoing LIDAR signal is different in adjacent periods. For instance, when two periods are adjacent to one another in a cycle and the frequency of the outgoing LIDAR signal is increased in each of the two periods, the rate of increase can be different in the two adjacent periods. As will be described in more detail below, the electronics can employ output from the control branch in order to control the frequency of the outgoing LIDAR signal such that the frequency of the outgoing LIDAR signal as a function of time is known to the electronics.

In one example, a cycle includes at least a first period and a second period. During the first period, the electronics 62 can increase the frequency of the outgoing LIDAR signal and during the second period the electronics 62 can decrease the frequency of the outgoing LIDAR signal. For instance, the laser cavity can be configured to output an outgoing LIDAR signal (and accordingly a LIDAR output signal) with a wavelength of 1550 nm. During the first period, the electronics 62 can increase the frequency of the outgoing LIDAR signal (and accordingly a LIDAR output signal) such that the wavelength decreases from 1550 nm to 1459.98 nm followed by decreasing the frequency of the outgoing LIDAR signal such that the wavelength increases from 1459.98 nm to 1550 nm.

When the outgoing LIDAR signal frequency is increased during the first period, the resulting LIDAR output signal travels away from the chip and then returns to the chip as the incoming LIDAR signal signal. A portion of the incoming LIDAR signal becomes the comparative signal. During the time that the LIDAR output signal and the LIDAR input signal are traveling between the chip and a reflecting object, the frequency of the outgoing LIDAR signal continues to increase. Since a portion of the outgoing LIDAR signal becomes the reference signal, the frequency of the reference signal continues to increase. As a result, the comparative signal enters the light-combining component with a lower frequency than the reference signal concurrently entering the light-combining component. Additionally, the further the reflecting object is located from the chip, the more the frequency of the reference signal increases before the LIDAR input signal returns to the chip. Accordingly, the larger the difference between the frequency of the comparative signal and the frequency of the reference signal, the further the reflecting object is from the chip. As a result, the difference between the frequency of the comparative signal and the frequency of the reference signal is a function of the distance between the chip and the reflecting object.

For the same reasons, when the outgoing LIDAR signal frequency is decreased during the second period, the comparative signal enters the light-combining component with a higher frequency than the reference signal concurrently entering the light-combining component and the difference between the frequency of the comparative signal and the frequency of the reference signal during the second period is also function of the distance between the chip and the reflecting object.

In some instances, the difference between the frequency of the comparative signal and the frequency of the reference signal can also be a function of the Doppler effect because relative movement of the chip and reflecting object can also affect the frequency of the comparative signal. For instance, when the chip is moving toward or away from the reflecting object and/or the reflecting object is moving toward or away from the chip, the Doppler effect can affect the frequency of the comparative signal. Since the frequency of the comparative signal is a function of the speed the reflecting object is moving toward or away from the chip and/or the speed the chip is moving toward or away from the reflecting object, the difference between the frequency of the comparative signal and the frequency of the reference signal is also a function of the speed the reflecting object is moving toward or away from the chip and/or the speed the chip is moving toward or away from the reflecting object. Accordingly, the difference between the frequency of the comparative signal and the frequency of the reference signal is a function of the distance between the chip and the reflecting object and is also a function of the Doppler effect.

The composite sample signal and the data signal each effectively compares the comparative signal and the reference signal. For instance, since the light-combining component combines the comparative signal and the reference signal and these signals have different frequencies, there is beating between the comparative signal and reference signal. Accordingly, the composite sample signal and the data signal have a beat frequency related to the frequency difference between the comparative signal and the reference signal and the beat frequency can be used to determine the difference in the frequency of the comparative signal and the reference signal. A higher beat frequency for the composite sample signal and/or the data signal indicates a higher differential between the frequencies of the comparative signal and the reference signal. As a result, the beat frequency of the data signal is a function of the distance between the chip and the reflecting object and is also a function of the Doppler effect.

As noted above, the beat frequency is a function of two unknowns; the distance between the chip and the reflecting object and the relative velocity of the chip and the reflecting object (i.e., the contribution of the Doppler effect). The change in the frequency difference between the comparative signal and the reference signal ($\Delta f$) is given by $\Delta f = 2\Delta v f/c$ where f is the frequency of the LIDAR output signal and accordingly the reference signal, $\Delta v$ is the relative velocity of the chip and the reflecting object and c is the speed of light in air. The use of multiple different periods permits the electronics 62 to resolve the two unknowns. For instance, the beat frequency determined for the first period is related to the unknown distance and Doppler contribution and the beat frequency determined for the second period is also related to the unknown distance and Doppler contribution. The availability of the two relationships allows the electronics 62 to resolve the two unknowns. Accordingly, the distance between the chip and the reflecting object can be determined without influence from the Doppler effect. Further, in some instances, the electronics 62 use this distance in combination with the Doppler effect to determine the velocity of the reflecting object toward or away from the chip.

In instances where the relative velocity of target and source is zero or very small, the contribution of the Doppler effect to the beat frequency is essentially zero. In these instances, the Doppler effect does not make a substantial contribution to the beat frequency and the electronics 62 can take only the first period to determine the distance between the chip and the reflecting object.

During operation, the electronics 62 can adjust the frequency of the outgoing LIDAR signal in response to the electrical control signal output from the control light sensor 61. As noted above, the magnitude of the electrical control signal output from the control light sensor 61 is a function of the frequency of the outgoing LIDAR signal. Accordingly, the electronics 62 can adjust the frequency of the outgoing LIDAR signal in response to the magnitude of the control. For instance, while changing the frequency of the outgoing LIDAR signal during one of the periods, the electronics 62 can have a range of suitable values for the electrical control signal magnitude as a function of time. At multiple different times during a period, the electronics 62 can compare the electrical control signal magnitude to the range of values associated with the current time in the period. If the electrical control signal magnitude indicates that the frequency of the outgoing LIDAR signal is outside the associated range of electrical control signal magnitudes, the electronics 62 can operate the light source 10 so as to change the frequency of the outgoing LIDAR signal so it falls within the associated range. If the electrical control signal magnitude indicates that the frequency of the outgoing LIDAR signal is within the associated range of electrical control signal magnitudes, the electronics 62 do not change the frequency of the outgoing LIDAR signal.

During operation, the electronics 62 can adjust the level of attenuation provided by the output optical attenuator 46 in response to the sampling signal from the sampling light sensor 54. For instance, the electronics 62 operate the output optical attenuator 46 so as to increase the level of attenuation in response to the magnitude of the sampling signal being above a first signal threshold and/or decrease the magnitude of the power drop in response to the magnitude of the sampling signal being below a second signal threshold.

In some instances, the electronics 62 adjust the level of attenuation provided by the output optical attenuator 46 to prevent or reduce the effects of back-reflection on the performance of the laser cavity. For instance, the first signal threshold and/or the second signal threshold can optionally be selected to prevent or reduce the effects of back-reflection on the performance of the laser cavity. Back reflection occurs when a portion of the incoming LIDAR signal returns to the laser cavity. In some instances, on the order of 50% of the incoming LIDAR signal returns to the laser cavity. The back reflection can affect performance of the laser cavity when the power of the incoming LIDAR signal entering the partial return device 14 does not decrease below the power of the outgoing LIDAR signal exiting from the partial return device 14 ("power drop") by more than a minimum power drop threshold. In the illustrated chip, the minimum power drop threshold can be around 35 dB (0.03%). Accordingly, the incoming LIDAR signal can affect the performance of the laser cavity when the power of the incoming LIDAR signal entering the partial return device 14 is not more than 35 dB below the power of the outgoing LIDAR signal exiting from the partial return device 14.

The electronics 62 can operate the output optical attenuator 46 so as to reduce the effect of low power drops, e.g. when the target object is very close or highly reflective or both. As is evident from FIG. 1, operation of the output optical attenuator 46 so as to increase the level of attenuation reduces the power of the incoming LIDAR signal entering the partial return device 14 and also reduces the power of the outgoing LIDAR signal at a location away from the partial return device 14. Since the output optical attenuator 46 is located apart from the partial return device 14, the power of the outgoing LIDAR signal exiting from the partial return device 14 is not directly affected by the operation of the output optical attenuator 46. Accordingly, the operation of the output optical attenuator 46 so as to increase the level of attenuation increases the level of the power drop. As a result, the electronics can employ the optical attenuator 46 so as to tune the power drop.

Additionally, the magnitude of the sampling signal is related to the power drop. For instance, the magnitude of the sampling signal is related to the power of the comparative signal as is evident from FIG. 1. Since the comparative signal includes light from the incoming LIDAR signal and the LIDAR input signal, the magnitude of the sampling signal is related to the power of the incoming LIDAR signal and the magnitude of the LIDAR input signal. This result means the magnitude of the sampling signal is also related to the power of the incoming LIDAR signal. Accordingly, the magnitude of the sampling signal is related to the power drop.

Since the magnitude of the sampling signal is related to the power drop, the electronics 62 can use the magnitude of the sampling signal to operate the output optical attenuator so as to keep the magnitude of the comparative signal power within a target range. For instance, the electronics 62 can operate the output optical attenuator 46 so as to increase the magnitude of the power drop in response to the sampling signal indicating that the magnitude of power drop is at or below a first threshold and/or the electronics 62 can operate the output optical attenuator 46 so as to decrease the magnitude of the power drop in response to the sampling signal indicating that the magnitude of power drop is at or above a second threshold. In some instances, the first threshold is greater than or equal to the minimum power drop threshold. In one example, the electronics 62 operate the output optical attenuator 46 so as to increase the magnitude of the power drop in response to the magnitude of the sampling signal being above a first signal threshold and/or decrease the magnitude of the power drop in response to the magnitude of the sampling signal being below a second signal threshold. The identification of the value(s) for one, two, three, or four variables selected from the group consisting of the first threshold, the second threshold, the first signal threshold, and the second signal threshold can be determined from calibration of the optical chip during set-up of the LIDAR chip system.

Light sensors can become saturated when the power of the composite light signal exceeds a power threshold. When a light sensor becomes saturated, the magnitude of the data signal hits a maximum value that does not increase despite additional increases in the power of the composite light signal above the power threshold. Accordingly, data can be lost when the power of the composite light signal exceeds a power threshold. During operation, the electronics 62 can adjust the level of attenuation provided by the data optical attenuator 44 so the power of the composite light signal is maintained below a power threshold.

As is evident from FIG. 1, the magnitude of the sampling signal is related to the power of the comparative signal. Accordingly, the electronics 62 can operate the data optical attenuator 44 in response to output from the sampling signal. For instance, the electronics 62 can operate the data optical attenuator so as to increase attenuation of the comparative signal when the magnitude of the sampling signal indicates the power of the comparative signal is above an upper comparative signal threshold and/or can operate the data optical attenuator so as to decrease attenuation of the comparative signal when the magnitude of the sampling signal indicates the power of the comparative signal is below a lower comparative signal threshold. For instance, in some instances, the electronics 62 can increase attenuation of the comparative signal when the magnitude of the sampling signal is at or above an upper comparative threshold and/or the electronics 62 decrease attenuation of the comparative signal when the magnitude of the sampling signal is at or below an upper comparative signal threshold.

As noted above, the electronics 62 can adjust the level of attenuation provided by the output optical attenuator 46 in response to the sampling signal. The electronics 62 can adjust the level of attenuation provided by the data optical attenuator 44 in response to the sampling signal in addition or as an alternative to adjusting the level of attenuation provided by the output optical attenuator 46 in response to the sampling signal.

Figure 2:
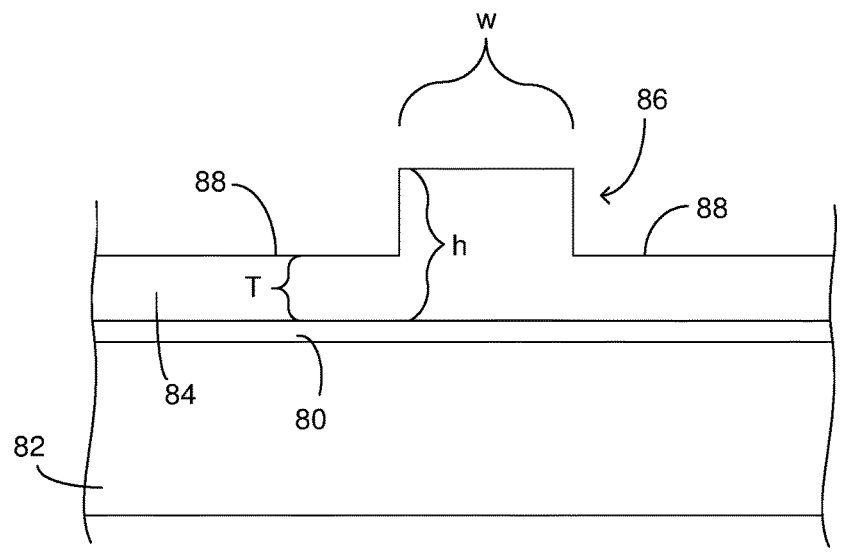
FIG. 2 is a cross-section of a LIDAR chip according to FIG. 1 constructed from a silicon-on-insulator wafer.

Suitable platforms for the chip include, but are not limited to, silica, indium phosphide, and silicon-on-insulator wafers. FIG. 2 is a cross-section of portion of a chip constructed from a silicon-on-insulator wafer. A silicon-on-insulator (SOI) wafer includes a buried layer 80 between a substrate 82 and a light-transmitting medium 84. In a silicon-on-insulator wafer, the buried layer is silica while the substrate and the light-transmitting medium are silicon. The substrate of an optical platform such as an SOI wafer can serve as the base for the entire chip. For instance, the optical components shown in FIG. 1 can be positioned on or over the top and/or lateral sides of the substrate.

The portion of the chip illustrated in FIG. 2 includes a waveguide construction that is suitable for use with chips constructed from silicon-on-insulator wafers. A ridge 86 of the light-transmitting medium extends away from slab regions 88 of the light-transmitting medium. The light signals are constrained between the top of the ridge and the buried oxide layer.

The dimensions of the ridge waveguide are labeled in FIG. 2. For instance, the ridge has a width labeled w and a height labeled h. A thickness of the slab regions is labeled T. For LIDAR applications, these dimensions are more important than other applications because of the need to use higher levels of optical power than are used in other applications. The ridge width (labeled w) is greater than 1 µm and less than 4 µm, the ridge height (labeled h) is greater than 1 µm and less than 4 µm, the slab region thickness is greater than 0.5 µm and less than 3 µm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide while curved portions of the waveguide and/or tapered portions of the waveguide have dimensions outside of these ranges. For instance, the tapered portions of the utility waveguide 16 illustrated in FIG. 1 can have a width and/or height that is >4 µm and can be in a range of 4 µm to 12 µm. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 µm and less than 0.5 µm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 2 is suitable for all or a portion of the waveguides selected from the group consisting of the cavity waveguide 12, utility waveguide 16, reference waveguide 27, comparative waveguide 30, first detector waveguide 36, second detector waveguide 38, sampling waveguide 52, control waveguide 57, and interferometer waveguide 60.

The light source 10 that is interfaced with the utility waveguide 16 can be a gain element that is a component separate from the chip and then attached to the chip. For instance, the light source 10 can be a gain element that is attached to the chip using a flip-chip arrangement.

Use of flip-chip arrangements is suitable when the light source 10 is to be interfaced with a ridge waveguide on a chip constructed from silicon-on-insulator wafer. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23, 1999; each of which is incorporated herein in its entirety. The constructions are suitable for use as the light source 10. When the light source 10 is a gain element, the electronics 62 can change the frequency of the outgoing LIDAR signal by changing the level of electrical current applied to through the gain element.

The attenuators can be a component that is separate from the chip and then attached to the chip. For instance, the attenuator can be included on an attenuator chip that is attached to the chip in a flip-chip arrangement. The use of attenuator chips is suitable for all or a portion of the attenuators selected from the group consisting of the data attenuator and the control attenuator.

As an alternative to including an attenuator on a separate component, all or a portion of the attenuators can be integrated with the chip. For instance, examples of attenuators that are interfaced with ridge waveguides on a chip constructed from a silicon-on-insulator wafer can be found in U.S. Pat. No. 5,908,305, issued on Jun. 1, 1999; each of which is incorporated herein in its entirety. The use of attenuators that are integrated with the chip are suitable for all or a portion of the light sensors selected from the group consisting of the data attenuator and the control attenuator.

Light sensors that are interfaced with waveguides on a chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the chip as illustrated in FIG. 1. Alternately, all or a portion the waveguides that terminate at a light sensor can terminate at a facet 18 located at an edge of the chip and the light sensor can be attached to the edge of the chip over the facet 18 such that the light sensor receives light that passes through the facet 18. The use of light sensors that are a separate component from the chip is suitable for all or a portion of the light sensors selected from the group consisting of the first light sensor 40, the second light sensor 42, the sampling light sensor 54, and the control light sensor 61.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108,8472, issued on Aug. 22, 2000 each of which is incorporated herein in its entirety. The use of light sensors that are integrated with the chip are suitable for all or a portion of the light sensors selected from the group consisting of the first light sensor 40, the second light sensor 42, the sampling light sensor 54, and the control light sensor 61.

Construction of optical gratings that are integrated with a variety of optical device platforms are available. For instance, a Bragg grating can be formed in a ridge waveguides by forming grooves in the top of the ridge and/or in the later sides of the ridge.

In some instances, it is desirable to scan the LIDAR output signal. The above chip construction is suitable for use with various scanning mechanisms used in LIDAR applications. For instance, the output LIDAR signal can be received by one or more reflecting devices and/or one more collimating devices. The one or more reflecting devices can be configured to re-direct and/or steer the LIDAR output signal so as to provide scanning of the LIDAR output signal. Suitable reflecting devices include, but are not limited to, mirrors such mechanically driven mirrors and Micro Electro Mechanical System (MEMS) mirrors. The one or more collimating devices provide collimation of the LIDAR output signal and can accordingly increase the portion of the LIDAR input signal that is received in the utility waveguide 16. Suitable collimating devices include, but are not limited to, individual lenses and compound lenses.

Figure 3:
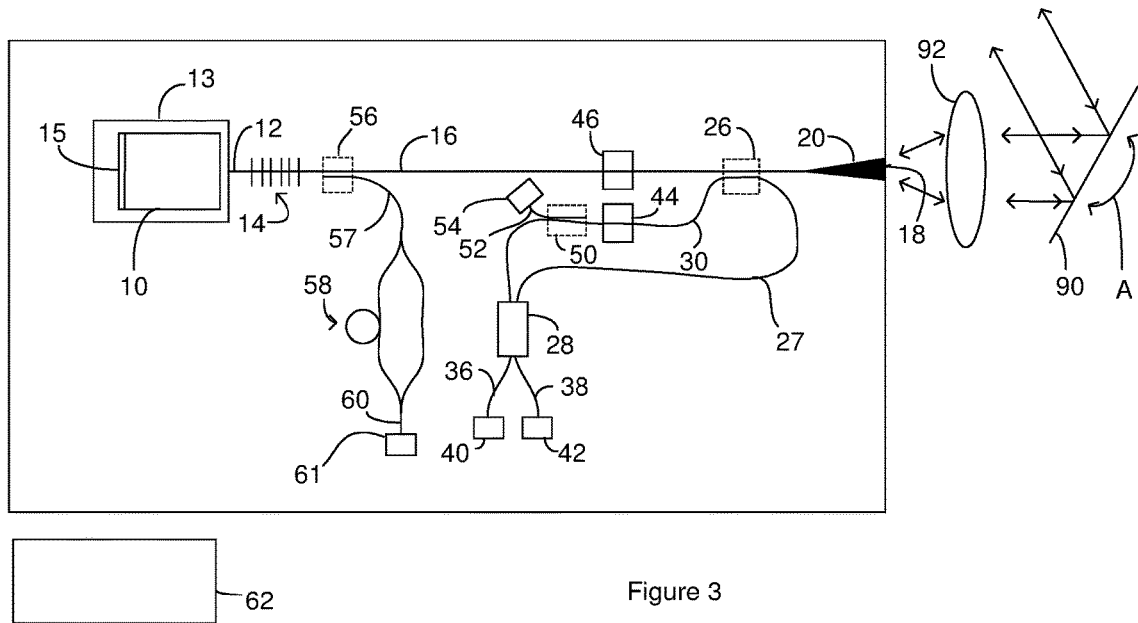
FIG. 3 illustrates the LIDAR chip of FIG. 1 used with an off-chip scanning mechanism.

FIG. 3 illustrates the above chip used with a reflecting device 90 and a collimating device 92. For instance, a lens serves as a collimating device that receives the LIDAR output signal and provides collimation of the LIDAR output signal. A mirror serves as a reflecting device 90 that receives the collimated LIDAR output signal and reflects the collimated LIDAR output signal in the desired direction. As is illustrated by the arrow labeled A, the electronics can move the mirror so as to steer the collimated LIDAR output signal and/or scan the collimated LIDAR output signal. The movement of the mirror can be in two dimensions or three dimensions. Suitable mirrors include, but are not limited to, mechanically driven mirrors and Micro Electro Mechanical System (MEMS) mirrors.

Figure 4:
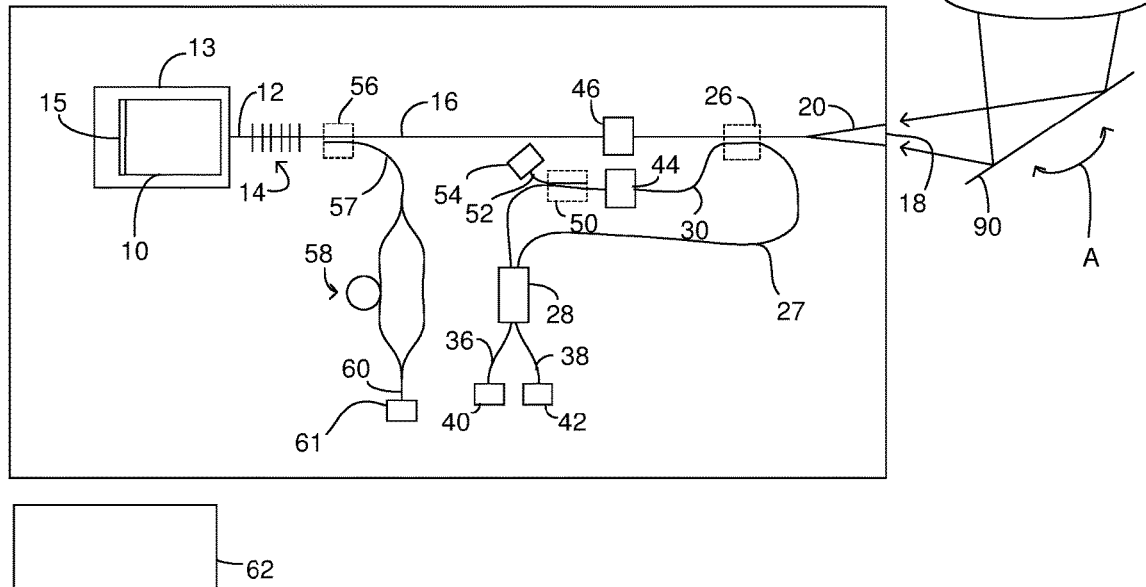
FIG. 4 illustrates the LIDAR chip of FIG. 1 used with another embodiment of an off-chip scanning mechanism.

FIG. 4 illustrates the above chip used with a reflecting device 90 and a collimating device 92. For instance, a mirror serves as a reflecting device 90 that receives the LIDAR output signal and reflects the LIDAR output signal in the desired direction. As is illustrated by the arrow labeled A, the electronics can move the mirror so as to steer the LIDAR output signal and/or scan the LIDAR output signal. A lens serves as a collimating device 92 that receives the LIDAR output signal from the mirror and provides collimation of the LIDAR output signal. The lens can be configured to move with the movement of the mirror so the lens continues to receive the LIDAR output signal at different positions of the mirror. Alternately, the movement of the mirror can be sufficiently limited that the lens continues to receive the LIDAR output signal at different positions of the mirror. The movement of the mirror can be in two dimensions or three dimensions. Suitable mirrors include, but are not limited to, mechanically driven mirrors and Micro Electro Mechanical System (MEMS) mirrors.

Figure 5:
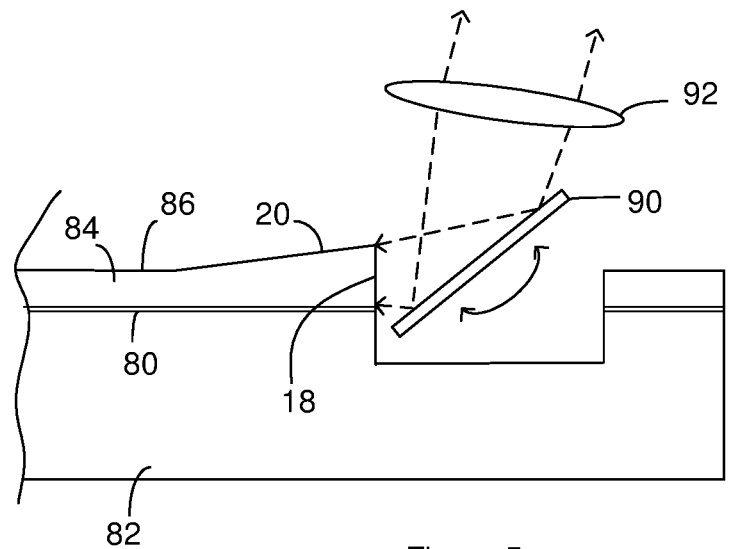
FIG. 5 is a cross section of the LIDAR chip of FIG. 1 having an integrated scanning mechanism.

Technologies such as SOI MEMS (Silicon-On-Insulator Micro Electro Mechanical System) technology can be used to incorporate a reflecting device such as a MEMS mirror into the chip. For instance, FIG. 5 is a cross section of a portion of the chip taken through the longitudinal axis of the utility waveguide 16. The illustrated chip was constructed on silicon-on-insulator waveguide. A mirror recess extends through the light-transmitting medium to the base. The mirror is positioned in the mirror recess such that the mirror receives the LIDAR output signal from the utility waveguide. A lens serves as a collimating device 92 that receives the LIDAR output signal from the mirror and provides collimation of the LIDAR output signal. The lens can be configured to move with the movement of the mirror so the lens continues to receive the LIDAR output signal at different positions of the mirror. Alternately, the movement of the mirror can be sufficiently limited that the lens continues to receive the LIDAR output signal at different positions of the mirror. The electronics can control movement of the mirror in two or three dimensions.

LIDAR system specifications often require that LIDAR data (distance and/or radial velocity between a reflecting object and a LIDAR chip) be generated for multiple sample regions in a field of view. The specifications often require that the LIDAR data be developed with a particular frequency. The ability to develop the LIDAR data at the required frequency rate is a challenge for many LIDAR systems. It has been proposed that these specifications can be satisfied using continuous scanning of a LIDAR output signal. In continuous scanning, the LIDAR output signal is moved continuously as the LIDAR output signal is sequentially steered to the different samples regions in the field of view. However, as the reflecting object moves further from the LIDAR chip, the time needed for the LIDAR output signal to travel to the reflecting object and back to the LIDAR chip increases. At the scanning speed needed for many LIDAR applications, the continuous scanning causes the optical pathway from the LIDAR chip to reflecting object and back to the data branch to change significantly within the time needed for the LIDAR output signal to be reflected back to the LIDAR chip. In many applications, the level of change is sufficient to cause a loss of signal and poor results.

The scan rate of a LIDAR system can be increased through the use of multiple LIDAR chips that are each in optical communication with an emitter head configured to output multiple LIDAR output signals. The LIDAR system can include one or more beam steering mechanisms for changing the direction of the LIDAR output signals relative to the emitter head. The change in direction changes the sample region of the field of view being illuminated by the LIDAR output signals. Additionally, the LIDAR system can include one or more actuators that move the emitter head relative to the field of view without changing the direction of the LIDAR output signals relative to the emitter head. This movement also changes the sample region of the field of view being illuminated by the LIDAR output signals. The actuator(s) can be used in combination with the beam steering mechanisms to scan the LIDAR output signals to sample regions in the field of view.

Figure 6:
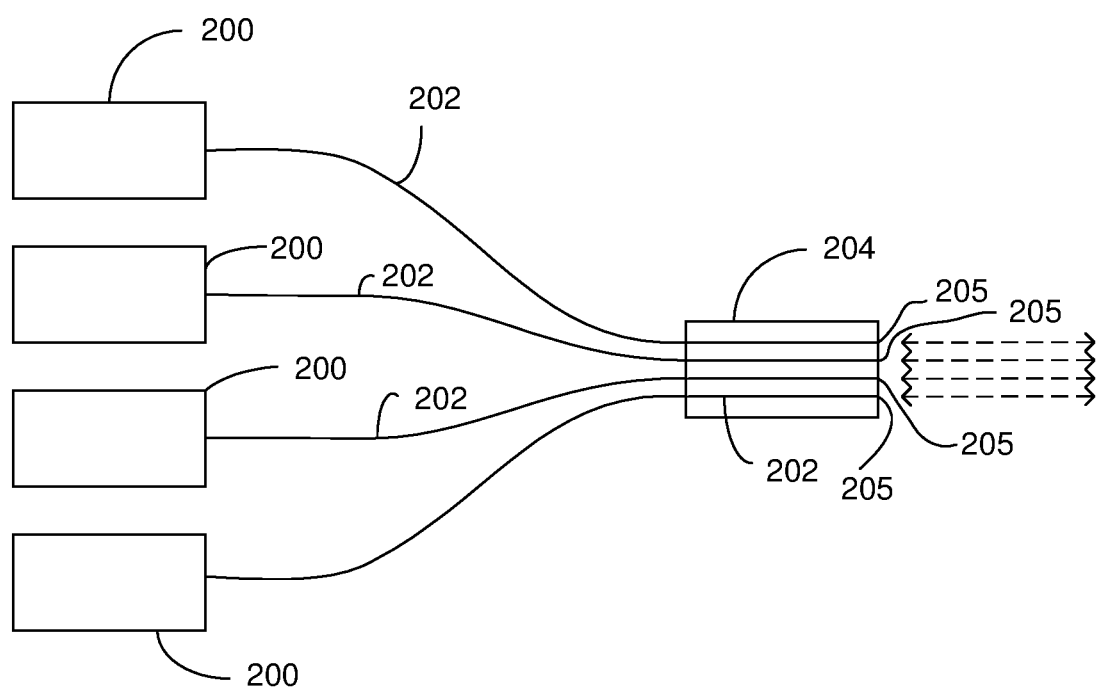
FIG. 6 is a schematic of a LIDAR system that includes multiple LIDAR chips.

FIG. 6 is an example of a LIDAR system that includes multiple LIDAR chips 200. In some instances, each of the LIDAR chips is constructed and/or operated as disclosed above. The LIDAR system includes multiple optical fibers 202 that are each in optical communication with a holder 204 and with one of the LIDAR chips. During operation of the LIDAR system, each optical fiber 202 receives a LIDAR output signal from one of the LIDAR chips and carries the LIDAR output signal to the holder 204. The holder 204 is configured such that the LIDAR output signals can exit from the optical fibers 202 through a facet 205 at a terminal end of the optical fiber 202. The LIDAR output signals that exit from the optical fibers 202 through the facet 205 can serve as head output signals. When a reflecting object reflects the LIDAR output signals (head output signals), the resulting LIDAR input signals (head output signals) can enter the optical fibers 202 through the facets 205 of the optical fibers 202. The optical fibers 202 carry the LIDAR input signals back to the LIDAR chips. The LIDAR chips can receive the LIDAR input signals through facets of utility waveguides 16. Accordingly, the LIDAR input signals can each serves as an incoming LIDAR signal that carries LIDAR data and is processed by the LIDAR chip.

In some instances, the holder 204 is configured such that the directions of the head output signals as they travel away from the holder 204 are parallel or substantially parallel. Additionally or alternately, the holder 204 can be configured to hold the optical fibers 202 such that the facets of the optical fibers 202 are arranged in a linear array or in a substantially linear array. In some instances where the facets of the optical fibers 202 are arranged in a linear array or in a substantially linear array, the spacing between the facets is constant or substantially constant.

Although FIG. 6 illustrates the LIDAR output signals each being output from a different LIDAR chip, the components of different LIDAR chips can be integrated onto a single LIDAR chip. Accordingly, more than one LIDAR output signal can be output from a single LIDAR chip.

Although not illustrated, the LIDAR chips can include an optical port for coupling an optical fiber 202 with the LIDAR chip. When the LIDAR chip is constructed on a silicon-on-insulator wafer, suitable optical ports are disclosed in U.S. Pat. No. 6,108,472 assigned U.S. patent application Ser. No. 09/019,729, filed on Feb. 6, 1998, entitled "Device for Re-directing Light From Optical Waveguide", and in U.S. Pat. No. 7,245,803 assigned U.S. patent application Ser. No. 10/776,475, filed on Feb. 10, 2004, entitled "Optical Waveguide Grating Coupler," each of which is incorporated herein in its entirety. Examples of suitable holders 204 for the optical fibers 202 include, but are not limited to, a v-groove fiber array, u-groove fiber array, and fiber ferrules. Although the holder 204 is shown a holding four optical fibers 202, the holder 204 can hold a different number of optical fibers 202. In some instances, the holder 204 holds a number of optical fibers 202 greater than or equal to 2, 4, or 8 and/or less than 16, 32, or 64.

Figure 7A:
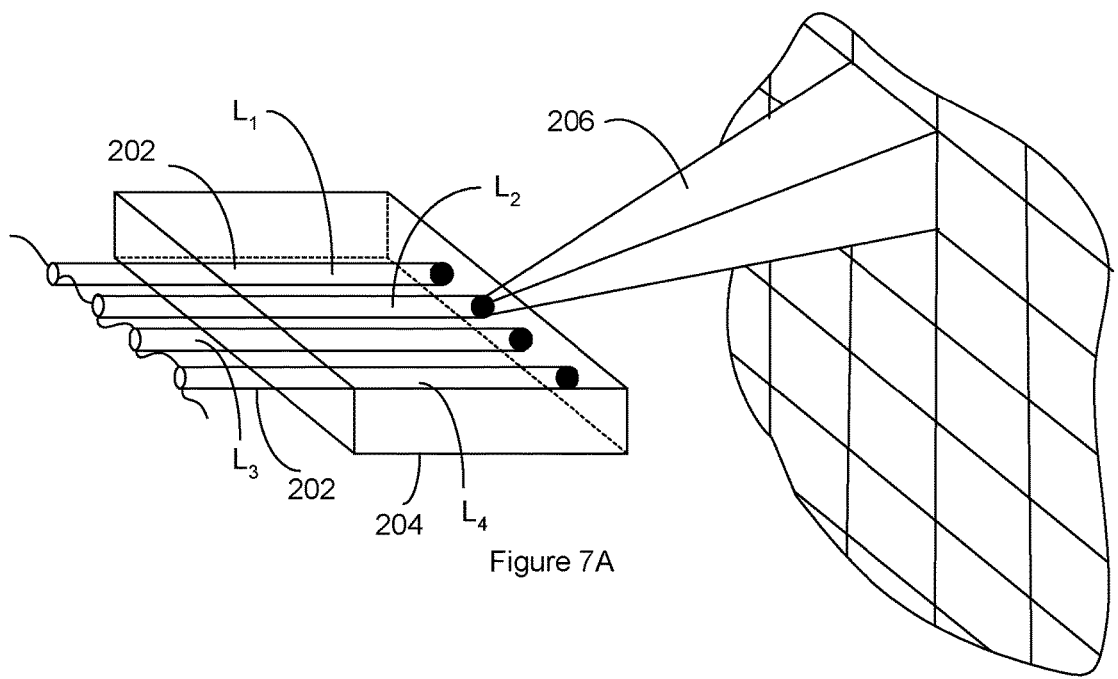
FIG. 7A illustrates the relationship between the LIDAR system of FIG. 6 and a portion of a field of view to be sampled by the LIDAR system.

FIG. 7A illustrates the relationship between a holder 204 of FIG. 6 and a portion of a field of view to be sampled by the LIDAR system. The field of view includes an array of sample regions 206. LIDAR performance specifications generally define the sample regions 206 as being at a particular angle from the LIDAR chip or a source that includes the LIDAR chip (i.e. a vehicle). For the purposes of simplification, a complete sample region 206 is illustrated for only one sample region 206 in the field of view. The other sample regions 206 and the remaining portions of the field of view are treated as a plane at a particular distance from the LIDAR chip or source. This treatment of the field of view and the sample regions as being positioned in a two-dimensional space is also continued in FIG. 7B and FIG. 7C; however, the two-dimensional field of view and the sample regions can represent three-dimensional spaces as is evident from the fully illustrated sample region of FIG. 7A.

FIG. 7A illustrates a single one of the head output signals illuminating one of the sample regions 206; however, during operation of the LIDAR system, the illustrated holder can produce four head output signals that are each illuminates a different one of the sample regions 206 in the field of view. In some instances, the holder produces four head output signals that are each concurrently illuminates different sample regions 206 in the field of view.

Figure 7B:
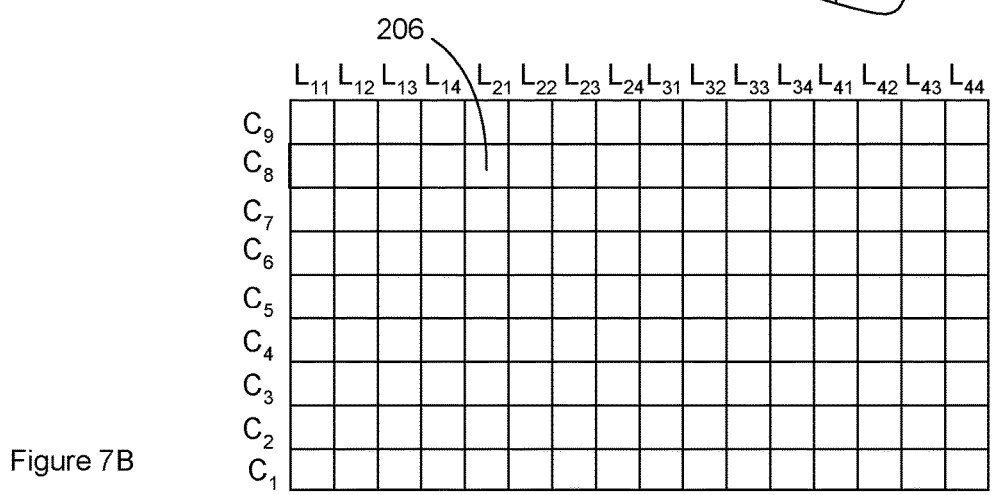
FIG. 7B is a schematic of an example of a possible field of view.

During operation of the LIDAR system, the head output signals illuminate sample region 206 during a scan of the field of view. For instance, FIG. 7B illustrates an example of a possible field of view. In order to illustrate one possible pattern for illuminating the sample regions 206 in the field of view, the sample regions 206 are divided into columns labeled $L_{ij}$ and rows labeled $C_k$ where the index i identifies one of the head output signals, j represents the sequence of the sample regions 206 illuminated by head output signal i, and k represents the sequence of rows illuminated by the head output signals. In one example of how this field of view can be scanned, the scan starts with the head output signals $L_1$ through $L_4$ concurrently illuminating the sample regions 206 in the row labeled $C_1$ and associated with the labels identified $L_{11}$ through $L_{41}$. The index j is then advanced by 1 and the scan proceeds such that the head output signals $L_1$ through $L_4$ concurrently illuminate the sample regions 206 in the row labeled $C_1$ and associated with the labels identified $L_{12}$ through $L_{42}$. The index j is sequentially advanced by 1 until all of the sample regions 206 in the row labeled $C_1$ are illuminated. When all of the sample regions 206 in the row labeled $C_1$ are illuminated, the value of j is returned to 1, the value of k is advanced by 1, and the scanning continues as described above. The sequence in which the sample regions 206 are illuminated in the above example are provided for the purposes of illustration and other sequences can be used.

Figure 7C:
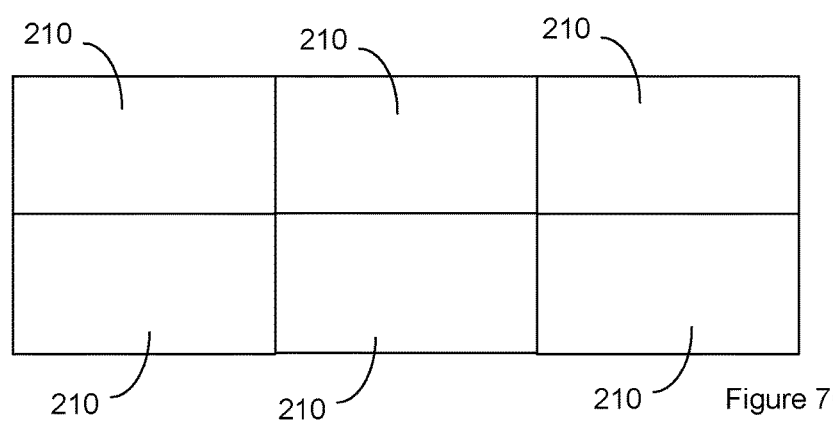
FIG. 7C is a schematic of a field of view assembled from multiple sub-fields.

In some instances, the field of view in FIG. 7B represents a sub-field of view. For instance, two or more sub-fields can be combined to provide a single continuous field of view. As an example, FIG. 7C illustrates a field of view assembled from multiple sub-fields 210. Each sub-field 210 can include multiple sample regions 206 (not shown in FIG. 7B). For instance, each sub-field 210 shown in FIG. 7C can include sample regions 206 arranged as described in the context of FIG. 7B. The sub-fields 210 can be scanned sequentially. For instance, the different sub-fields 210 can be sequentially scanned and the sample regions 206 in each of the individual sub-fields 210 can be scanned as described in the context of FIG. 7B.

Figure 8A:
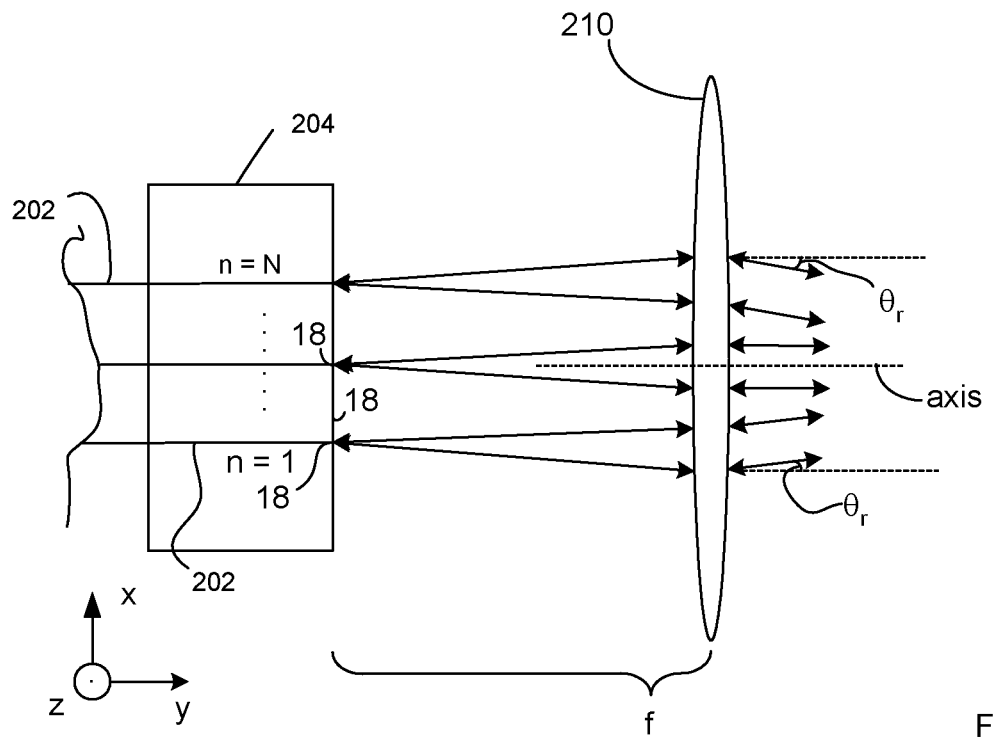
FIG. 8A is a schematic of a beam steering mechanism that changes the direction of a LIDAR output signals relative to a holder included in the LIDAR system.

The movement of the head output signals to different sample regions 206 can be performed through a combination of mechanisms. An example mechanism includes or consists of one or more beam steering mechanisms. A beam steering mechanism changes the direction of the head output signals relative to the holder 204. An example of a beam steering mechanism is disclosed in FIG. 8A. Each of the head output signals is received at a different region of a lens 210. As is shown in FIG. 8A, the holder 204 and lens are arranged such that each of the head output signals travels through the lens and then travels away from the lens at a different deflection angle labeled $\theta_r$ in FIG. 8A. Here the deflection angle is measured relative to the optical axis. In some instance, the system is configured such that the difference in the deflection angle of adjacent head output signals is constant or substantially constant ($\Delta\theta$).

Figure 8B:
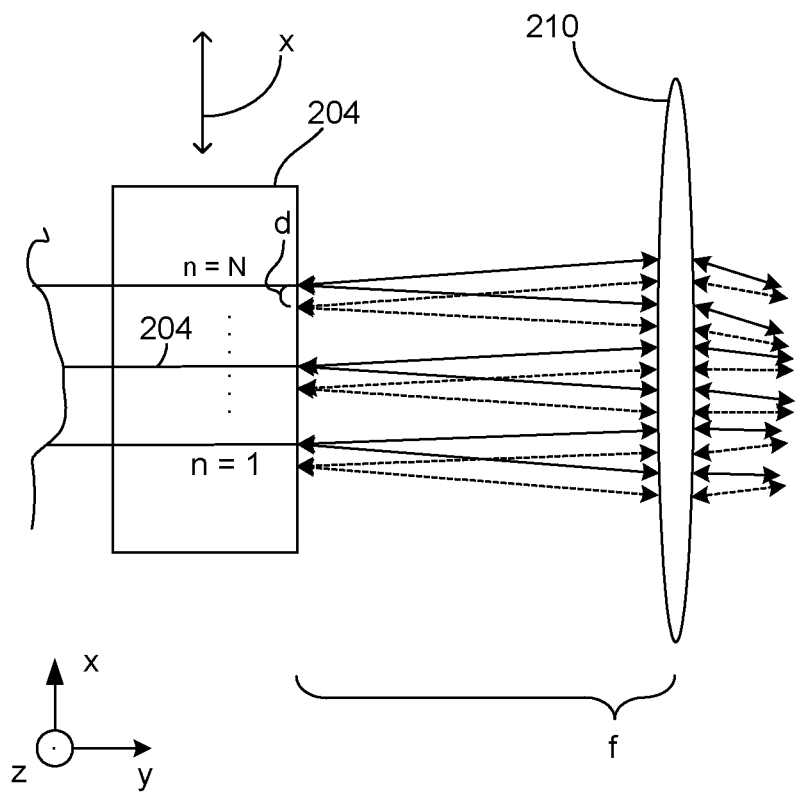
FIG. 8B is a topview of a LIDAR system where a holder and a lens are moved relative to one another.

FIG. 8B is a topview of the LIDAR system. The line labeled x in FIG. 8B illustrates the holder being moved while the lens is held stationary relative to the field of view although other combinations are possible. In some instances, the movements are performed so as to position one or more facets on or substantially on the focal line. Because the focal line is generally curved, in instances where it is not possible to maintain the position of the one or more facets on or substantially on the focal line, corrective optics can be employed to flatten the focal line. The movement of the holder and lens relative to one another changes the region of the lens that is illuminated by each of the head output signals and accordingly changes the angle of incidence between the lens and each of the head output signals. The change in angle of incidence changes the deflection angle of each head output signal. As a result, the movement of the holder and lens relative to one another changes steers the head output signals within the field of view. When the movement of FIG. 8B is considered to be horizontal movement of the holder and lens relative to one another, this movement causes changes in the angle between the head output signals and a vertical plane. The electronics can use this change in direction to steer the head output signals from one sample region 206 to the next. For instance, the electronics can use this change in direction to steer the head output signals between sample regions 206 in the same row of the sub-field 210 shown in FIG. 7A. As an example, the electronics can use this change in direction to steer the head output signals from concurrently illuminating $L_{11}$, $L_{21}$, $L_{31}$, and $L_{41}$ of $C_1$ in FIG. 7A to concurrently illuminating $L_{12}$, $L_{22}$, $L_{32}$, and $L_{42}$ of $C_1$ in FIG. 7A.

Figure 8C:
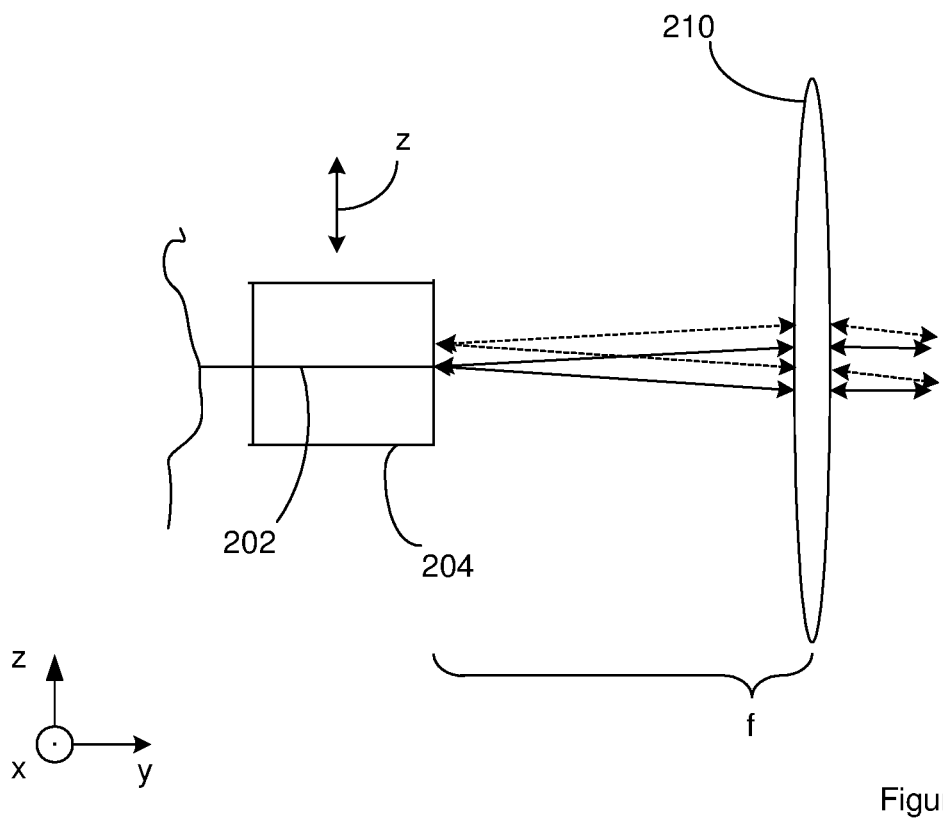
FIG. 8C is a sideview of a LIDAR system where a holder and a lens are moved relative to one another in a direction that is perpendicular to the direction of movement illustrated in FIG. 8B.

FIG. 8B illustrates movement of the lens and the holder relative to one another in a first plane that includes the facets of the optical fibers 202 and passes through the lens. Additionally or alternately, the electronics can be configured to move the lens and the holder relative to one another in a second plane that is perpendicular to the first plane. As an example, FIG. 8C is a sideview of the LIDAR system where the line labeled z in FIG. 8C shows the holder moving in a plane that is perpendicular to a first plane that includes the facets of the optical fibers 202 and passes through the lens. As is evident from FIG. 8C, this movement changes the region where each head output signal is incident on the lens and accordingly changes the direction of each head output signal as it travels away from the lens. The movement in FIG. 8C changes the angle of the head output signals relative to the first plane and the movement in FIG. 8C changes the angle of the head output signals relative to the second plane. When the movement of FIG. 8C is considered to be vertical movement of the holder and lens relative to one another, this movement causes changes in the angle between the head output signals and a horizontal plane. The electronics can use this change in direction to steer the head output signals from one sample region 206 to the next. For instance, the electronics can use this change in direction to steer the head output signals between sample regions 206 in different rows of the sub-field 210 shown in FIG. 7A. As an example, the electronics can use this change in direction to steer the head output signals from concurrently illuminating $L_{11}$, $L_{21}$, $L_{31}$, and $L_{41}$ of $C_1$ in FIG. 7A to concurrently illuminating $L_{11}$, $L_{21}$, $L_{31}$, and $L_{41}$ of $C_2$ in FIG. 7A.

When the lens and the holder are configured to be moved relative to one another in the second plane and in the first plane, the electronics can use this change in direction to steer the head output signals between from one sample region 206 to the next. For instance, the electronics can use this change in direction to steer the head output signals between sample regions 206 in the same row of the sub-field 210 shown in FIG. 7A and also between sample regions 206 in the same column. As an example, the electronics can use this change in direction to steer the head output signals from concurrently illuminating $L_{13}$, $L_{23}$, $L_{33}$, and $L_{43}$ of $C_1$ in FIG. 7A to concurrently illuminating $L_{14}$, $L_{24}$, $L_{34}$, and $L_{44}$ of $C_1$ in FIG. 7A, and then to concurrently illuminating $L_{11}$, $L_{21}$, $L_{31}$, and $L_{41}$ of $C_2$ in FIG. 7A. Accordingly, the beam steering technology of FIG. 8A through FIG. 8C can be used to scan the head output signals to each of the sample regions 206 shown in the field of view of FIG. 7A.

Figure 9:
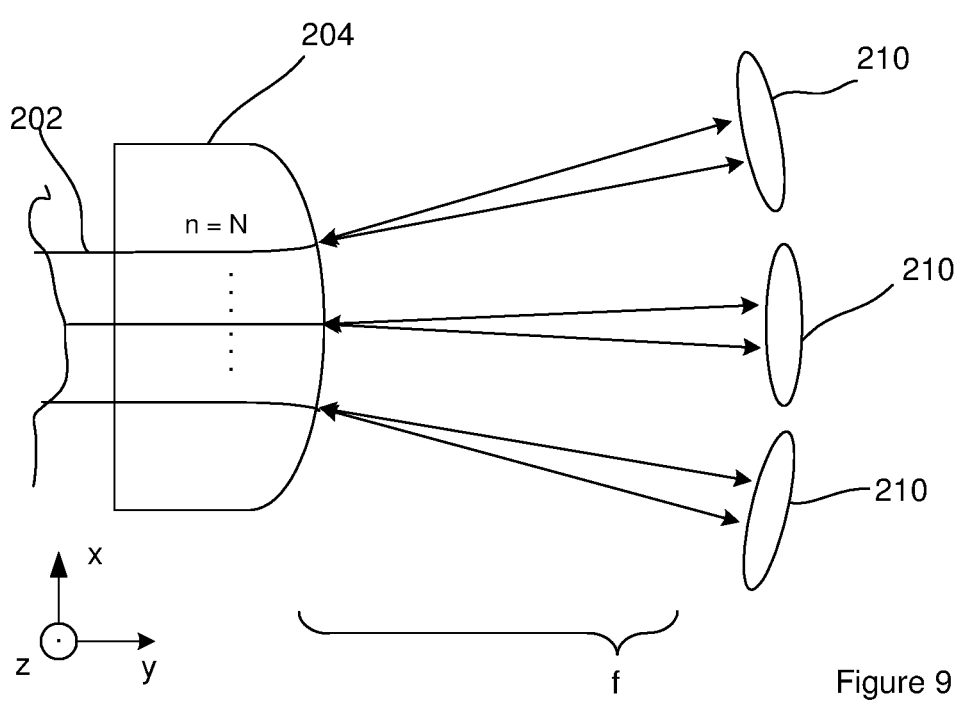
FIG. 9 illustrates a LIDAR system where multiple lenses receive a head output signals from a holder.

Although FIG. 8A through FIG. 8C illustrate a single lens used with the head output signals from a single holder, more than one lens can be used with the head output signals from a single holder. For instance, FIG. 9 illustrates a LIDAR system where multiple lenses receive the head output signals from a single holder. Although each lens is illustrated receiving one of the head output signals, one, more than one, or all of the lenses can receive more than one of the head output signals. The use of multiple lenses may be advantageous because may be easier to optimize the light coupling efficiency over multiple outputs.

The lenses can be configured such that each lens collimates or substantially collimates the one or more head output signals received by the lens. Additionally or alternately, the lenses can be positioned at the focal length from one or more facets of the optical fiber 202. The electronics can steer the directions of the head output signals as described above. For instance, the electronics can cause movement of the lenses and the holder so as to change the location where each head output signal illuminates a lens.

Figure 10A:
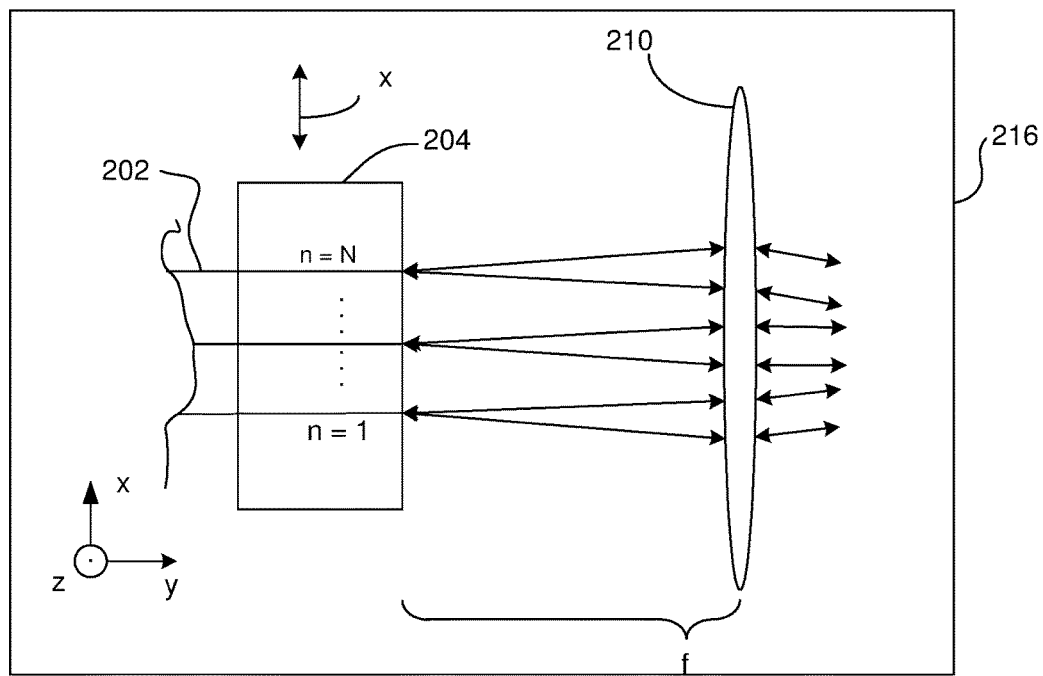
FIG. 10A through FIG. 10B illustrates an emitter head that includes a LIDAR system constructed according to FIG. 8A through FIG. 8C.
Figure 10B:
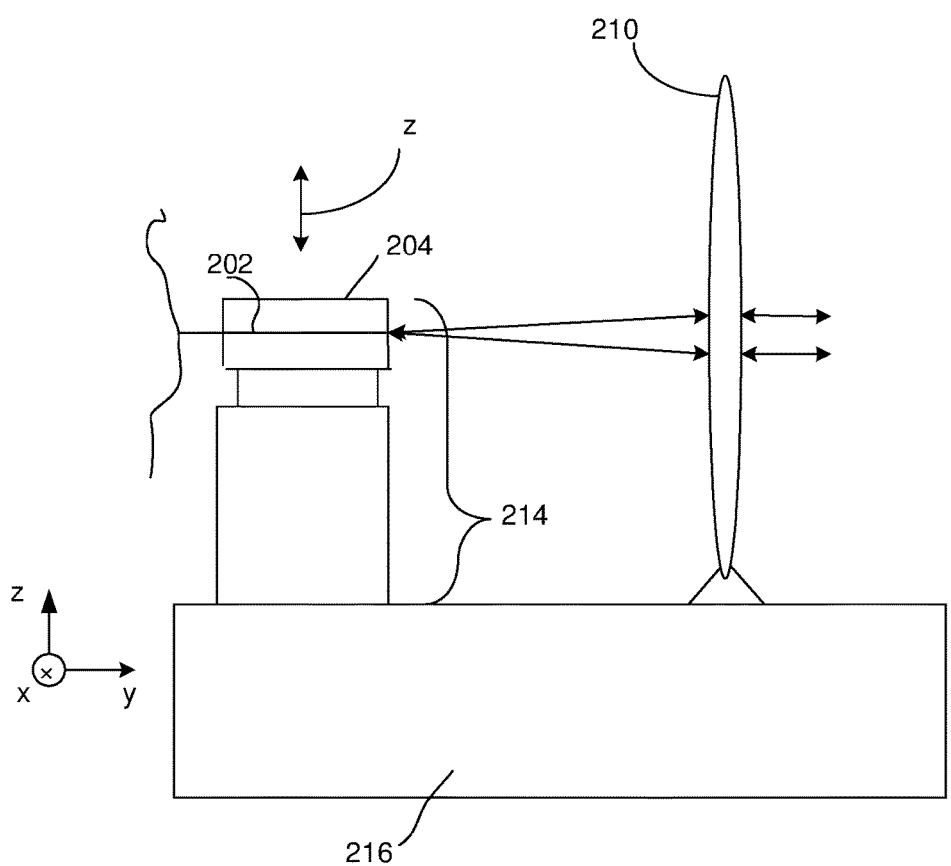

FIG. 10A through FIG. 10B illustrates an emitter head that includes a LIDAR system constructed according to FIG. 8A through FIG. 8C. FIG. 10A is a topview of the emitter head and FIG. 10B is a sideview of the emitter head. The holder is connected to an actuator 214 that is configured to provide movement of the holder relative to the lens. Electronics (not shown) are in communication with the actuator 214 and operate the actuator 214 so as to provide the desired movement. In some instances, the emitter head optionally includes a platform 216 on which the lens, actuator, and holder are positioned.

As is shown by the arrow labeled x in FIG. 10A, the electronics can optionally operate the actuator 214 so as to provide relative movement of the holder and the lens in the first plane. For instance, the lens can be stationary relative to the platform and/or field of view while the holder is moved in the direction of the line labeled x. This movement effectively provides the beam steering disclosed in the context of FIG. 8B. Additionally or alternately, as is shown by the arrow labeled z in FIG. 10B, the electronics can optionally operate the actuator 214 so as to provide relative movement of the holder and the lens in the second plane. For instance, the lens can be stationary relative to the platform and/or field of view while the holder is moved in the direction of the line labeled z. This movement effectively provides the beam steering disclosed in the context of FIG. 8C. Suitable actuators 214 include linear motion stages such as piezo motor driven stages including the Q-552.030 from PI which provides a maximum linear travel range of 6.5 mm at a speed of 10 mm/s (PI USA, 2018) and voice coil actuators (VCAs) such as the XV005F-6S16 linear stage (Technohands Co, Japan, 2019) which provides a maximum linear travel range of 7 mm at a speed of 14 mm/s.

Figure 10C:
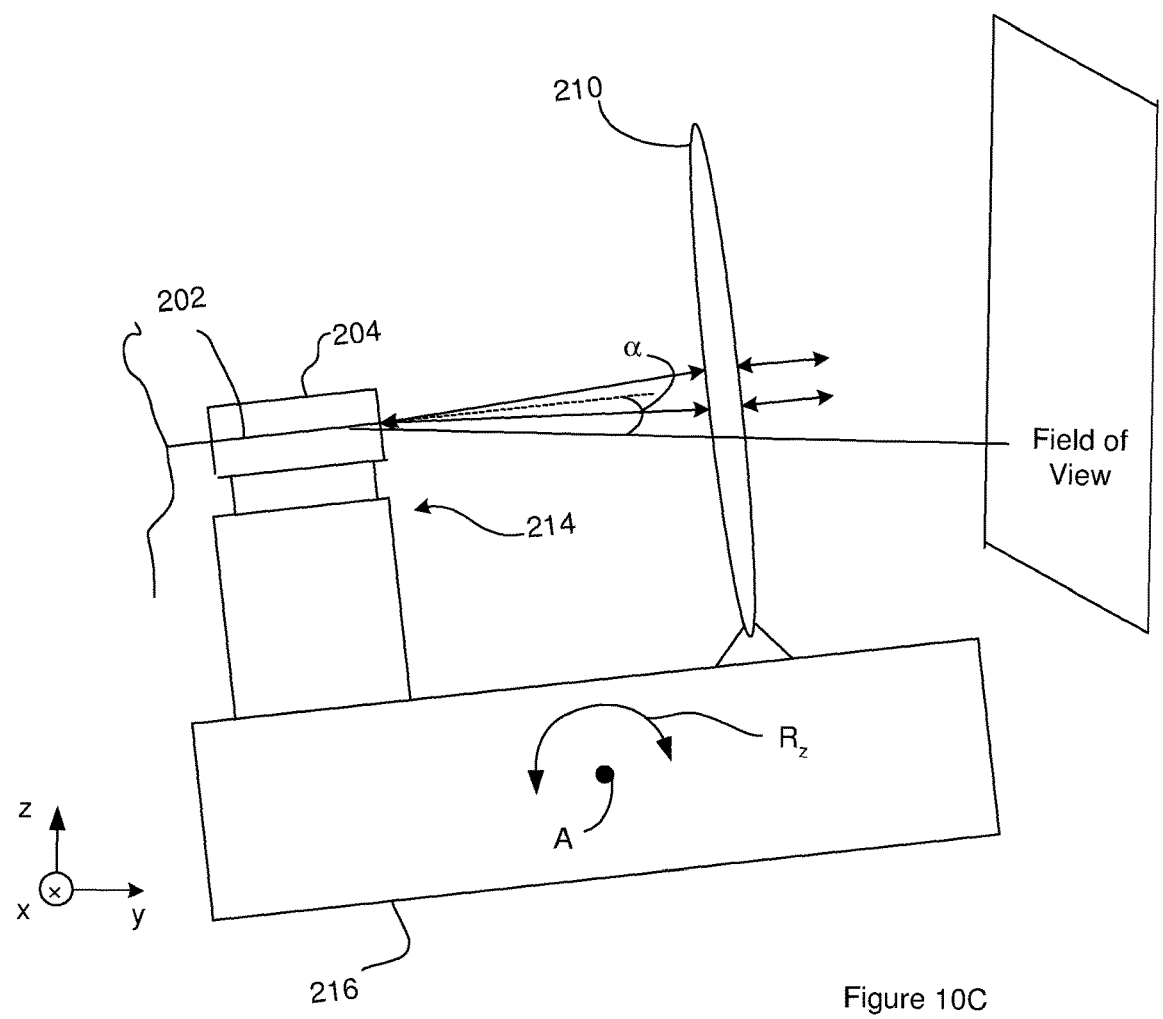
FIG. 10C and FIG. 10D illustrate an emitter head that is configured to be moved relative to the field of view.
Figure 10D:
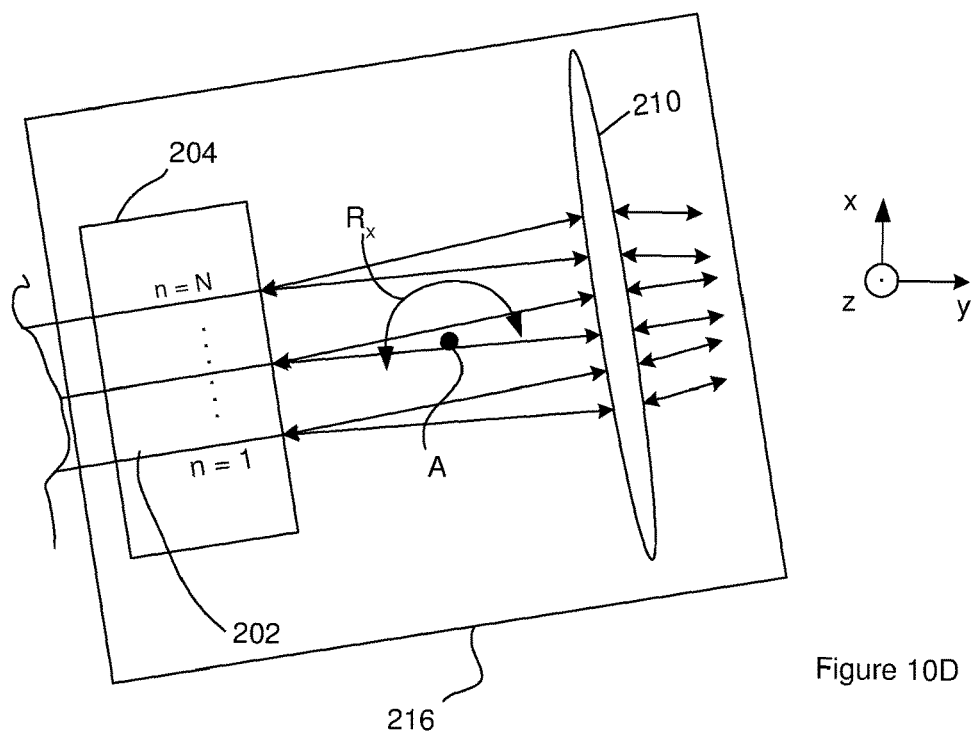

Emitter head movement can be employed in combination with the beam steering technologies. For instance, the emitter head can be connected to a head actuator (not shown) that is configured move the emitter head in addition to movement of the holder or as an alternative to movement of the holder. For instance, FIG. 10C and FIG. 10D illustrate an emitter head that is configured to be moved relative to the field of view. FIG. 10C is a sideview of the emitter head and FIG. 10D is a topview of the emitter head. In some instances, the emitter head is constructed and/or operated according to FIG. 10A and/or FIG. 10B. The emitter head is in electrical communication with electronics (not shown) that can provide the movement of the emitter head relative to the field of view. As is evident from the arrow labeled $R_z$ in FIG. 10C, the emitter head can be rotated around an axis labeled A such that the angle between the first plane and a plane perpendicular to the field of view changes. The illustrated axis extends through the platform and is spaced apart from the emitter head. The emitter head can have any orientation relative to the horizontal and vertical planes. When the z axis in FIG. 10C represents a vertical vector, the $R_z$ movement can move the head output signals up and down on the field of view. When the z axis in FIG. 10C represents a horizontal vector, the $R_z$ movement can move the head output signals left and right on the field of view.

The emitter head can be rotated in around an axis labeled A as illustrated by the arrow labeled $R_x$ in FIG. 10D in addition or as an alternative to the movement in accordance with the arrow labeled $R_z$ in FIG. 10C. The illustrated axis extends through the emitter head. This movement changes the angle between the head output signals and the second plane. When the z axis in FIG. 10D represents a vertical vector, the $R_x$ movement can move the head output signals left and right on the field of view. When the z axis in FIG. 10C represents a horizontal vector, this movement can move the head output signals up and down on the field of view.

Although FIG. 10C and FIG. 10D illustrate rotational movement of the emitter head, a suitable head actuator can provide translation of head in addition or as an alternative to the rotational movement. For instance, the emitter head can be translated so as to provide horizontal and/or vertical movement of the head output signals on the field of view.

A suitable head actuator includes, but is not limited to, the S-335 from PI which has a 2 degree scanning range and an operation frequency of up to 700 Hz (PI USA Active Optics, 2018).

Although FIG. 10A through FIG. 10D are disclosed in the context of the LIDAR systems of FIG. 8A through FIG. 8C, the emitter heads disclosed in the context of FIG. 10A through FIG. 10D can be constructed using the LIDAR system of FIG. 9. Accordingly, one or more of the above emitter head movements can be used in conjunction with an emitter head that includes a LIDAR system constructed according to FIG. 9.

Although the relative movement of the lens and holder are disclosed above in the context of the holder being moved while the lens remains stationary relative to the field of view and/or to a platform, the relative movement can be achieved by movement of the lens or movements of the lens and holder.

In some instances, beam steering is used to direct the head output signals to each of the sample regions 206 in the field of view or in a sub-field of view. Alternately, beam steering can be combined with one or more of the above emitter head movements to direct the head output signals to each of the sample regions 206 in the field of view or in a sub-field of view. For instance, in the field of view shown in FIG. 7A, beam steering can be used to move the head output signals horizontally and the emitter head movements of FIG. 10C can be used to move the head output signals vertically and/or vertical translation of the scanning head can be used to move the head output signals vertically. In some instances, beam steering technologies are effective over a limited angular range. Accordingly, in some instances, the field of view can be broken into two or more sub-fields of view as disclosed above. In these instances, one or more of the above emitter head movements can be to move the head output signals from one sub-field 210 to another sub-field 210 and within each sub-field 210 beam steering is used to direct the head output signals to each of the sample regions 206 in a sub-field 210 or beam steering is combined with one or more of the above emitter head movements to direct the head output signals to each of the sample regions 206 in each sub-field 210. In instances where the field of view is broken into multiple sub-fields 210, the combined scanning angle needed to scan multiple sub-fields 210 can exceed the effective scanning angle of the beam steering technology.

As noted above, the scanning of the sample regions 206 can make use of only one or more of the emitter head movements. In LIDAR systems where only a portion of the disclosed emitter head movements are used, the LIDAR system need only include the components needed for the one or more emitter head movements that are actually employed. As a result, an emitter head may be capable of only a portion of the disclosed emitter head movements or of all of the emitter head movements.

The scanning of the field of view can be step scanning. In step scanning, the movement of the head output signals is divided into two or more segments so as to reduce or eliminate challenges resulting from movement of the head output signals while waiting for the return of the LIDAR input signals to the one or more LIDAR chips. One of the segments is a re-location segment and another one of the segments is a data segment. A data segment is the time period between when the portion of a head output signals from which the LIDAR data is generated starts to illuminate a sample region 206 to the portion of the LIDAR input signal containing the desired LIDAR data has been received at the LIDAR chip. The re-location segment is the time between the LIDAR chip receiving the portion of the LIDAR input signal containing the desired LIDAR data at one sample region 206 and the next sample region 206 receiving the portion of the head output signals from which the LIDAR data is generated. Accordingly, the re-location segment includes the movement of the head output signals from one sample region 206 to the next sample region 206.

Figure 10E:
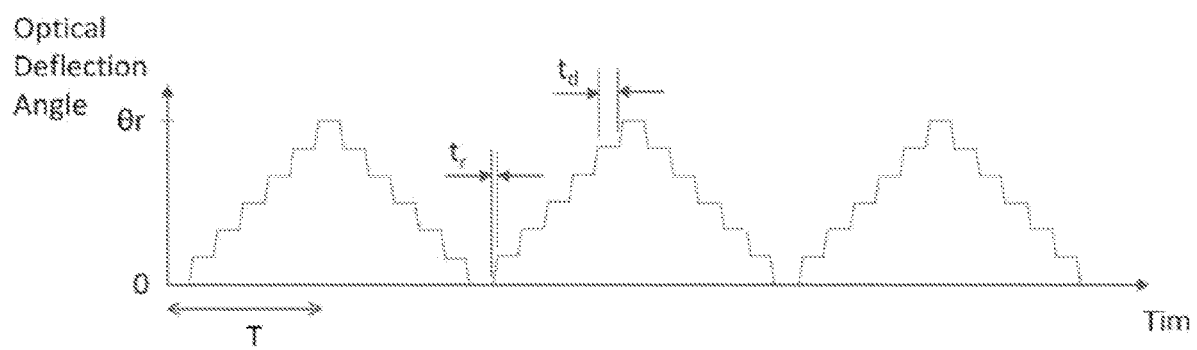
FIG. 10E is a graph that illustrates the timing of stepping-mode scanning.

In instances where step scanning divides movement of the head output signals into only two segments, the timing of the step scanning can be illustrated as shown in FIG. 10E where $t_r$ represents the time of the re-location segment and $t_d$ represents the time of the data segment. The movement of the head output signals can be stopped or slowed while generating the LIDAR data at a sample region 206 in order to reduce or eliminate challenges resulting from movement of the head output signals while waiting for the return of the LIDAR input signals to the one or more LIDAR chips. For instance, a ratio of the angular scanning speed during the re-location segment:angular scanning speed during the data segment can be more than 10000:1, 1000:1, or 100:1 and/or less than 50:1, 20:1, or 10:1. In some instances, these ratios are achieved when the time period for the data segment is more than 1000 µs, 100 µs, or 10 µs and/or less than 20 µs, 10 µs, or 5 µs.

The scan of the field of view can be continuous in that the head output signals are moving within a sample region of the field of view while generating the LIDAR data for that sample region. The continuous movement can be movement provided by the beam steering mechanism and/or by the actuator. For instance, the beam steering mechanism can provide stepped movement of the LIDAR output signals on the field of view while the one or more actuators provide continuous movement. Alternately, the beam steering mechanism can provide continuous movement of the LIDAR output signals on the field of view while the one or more actuators provide stepped movement.

Figure 11A:
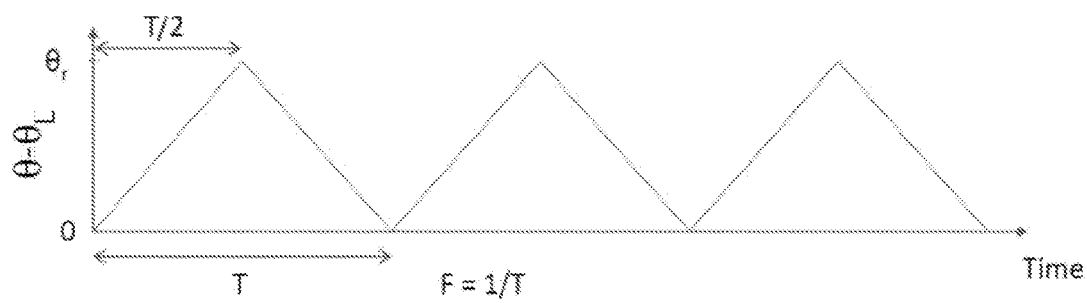
FIG. 11A and FIG. 11B illustrate a possible scan pattern for a head output signal on a field of view.
Figure 11B:
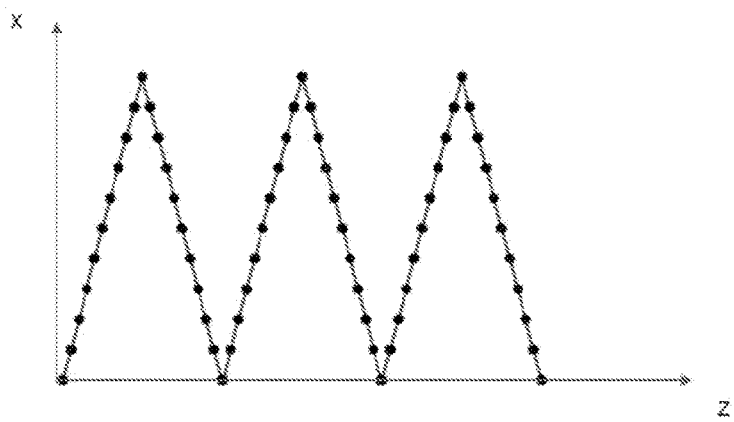

The step scanning of FIG. 10E can be effective for scanning a field of view where the sample regions are arranged in a square array such as the field of view shown in FIG. 7A and FIG. 7B. However, other arrangements of the sample regions in the field of view are possible. For instance, FIG. 11A and FIG. 11B illustrate a possible scan pattern for when the beam steering mechanism and actuator are both operated in a continuous scan mode rather than a step mode. FIG. 11A illustrates the deflection angle provided by a beam steering mechanism to a single head output signal as a function of time. In FIG. 11A, the y-axis is $\theta$-$\theta_L$ where $\theta$ represents the deflection angle of the head output signal and $\theta_L$ represents the lowest value for the deflection angle during the scan. The range of deflection angles for the head output signal during the scan is illustrated as $\theta_R$.

FIG. 11B illustrates the field of view associated with the scan shown in FIG. 11A. The line on the field of view illustrates the path that the head output signal follows on the field of view as a function of time. The dots on the line illustrate the point in time where the sampling of a sample region in the field of view is started.

Figure 11C:
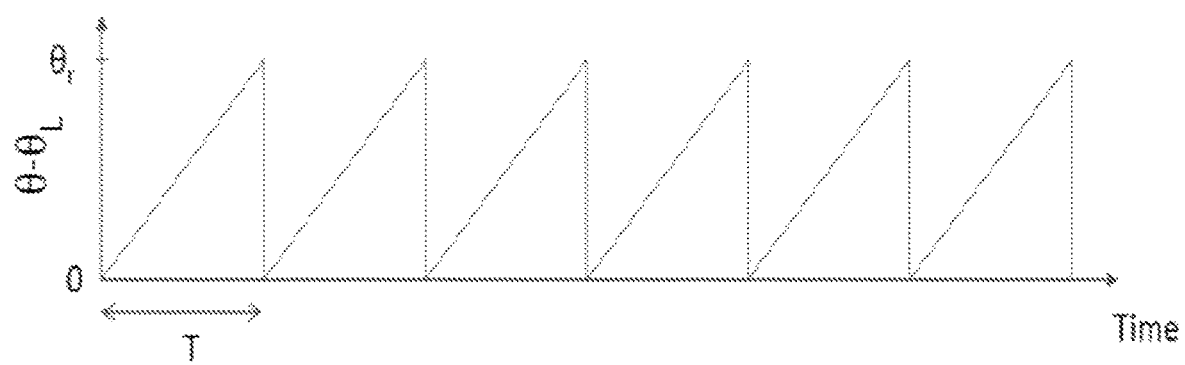
FIG. 11C and FIG. 11D illustrate a possible scan pattern for a head output signal on a field of view.
Figure 11D:
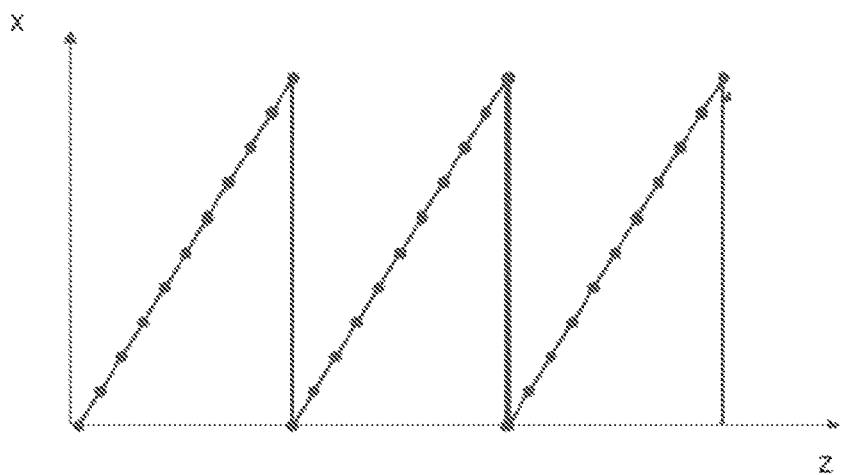

In the scan pattern of FIG. 11A through FIG. 11B, the spacing between the sample regions in the z direction changes. FIG. 11C through FIG. 11D illustrate a scan pattern where the spacing between the sample regions in the z direction is maintained.

Figure 11E:
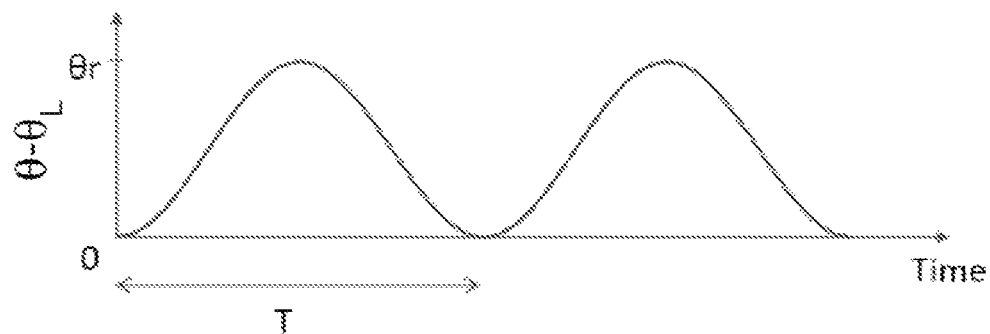
FIG. 11E and FIG. 11F illustrate a possible scan pattern for a head output signal on a field of view.
Figure 11F:
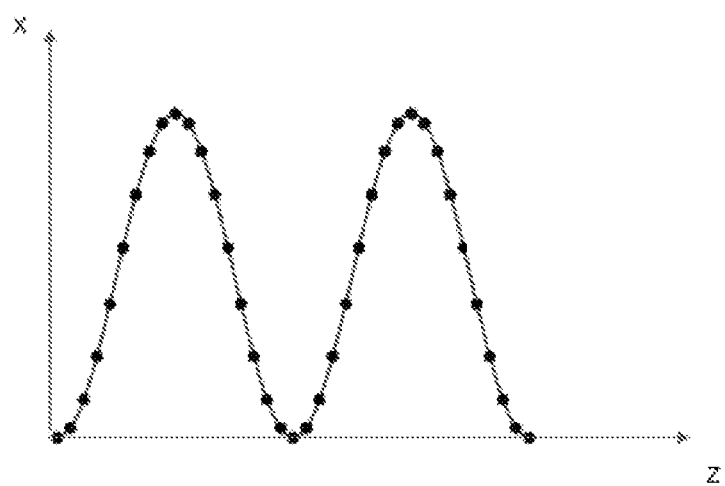

Although FIG. 11A through FIG. 11D show the path of the scan pattern including linear segments, the path can include or consist of curved segments. For instance, the scan pattern can be a sinusoid as illustrated in FIG. 11E and FIG. 11F.

The scan patterns of FIG. 11A through FIG. 11F can be executed when the movement of the head output signal in the z direction is provided by the actuator while the movement of the head output signal in the x direction is provided by the beam steering mechanism or the movement of the head output signal in the x direction is provided by the actuator while the movement of the head output signal in the z direction is provided by the beam steering mechanism.

In some instances where continuous scanning is employed, the angular scan rate for the head output signals is greater than 10 Hz, 100 Hz, or 1 kHz and/or less than 2 kHz, 10 kHz, or 20 kHz.

The limitations of current approaches to scanning a LIDAR beam produced by integrated optical chips are overcome by using fiber optics to couple from the output waveguides of single or multiple chips and using the fiber or fibers in an emitter head configuration that enables effective mechanical scanning of the output beams from the fiber or fibers.

Suitable electronics can include, but are not limited to, a controller that includes or consists of analog electrical circuits, digital electrical circuits, processors, microprocessors, digital signal processors (DSPs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Although the laser cavity is shown as being positioned on the chip, all or a portion of the laser cavity can be located off the chip. For instance, the utility waveguide 16 can terminate at a second facet through which the outgoing LIDAR signal can enter the utility waveguide 16 from a laser cavity located off the chip.

The chip can include components in addition to the illustrated components. As one example, optical attenuators (not illustrated) can be positioned along the first detector waveguide 36 and the second detector waveguide 38. The electronics can operate these attenuators so the power of the first portion of the composite sample signal that reaches the first light sensor 40 is the same or about the same as the power of the second portion of the composite sample signal that reaches the second light sensor 42. The electronics can operate the attenuators in response to output from the first light sensor 40 which indicates the power level of the first portion of the composite sample signal and the second light sensor 42 which indicates the power level of the second portion of the composite sample signal.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
   an emitter head that concurrently receives multiple different LIDAR output signals from one or more LIDAR chips and concurrently outputs multiple different head output signals such that each of the head output signals travels away from the emitter head in a different direction,
   each of the head output signals includes light from one of the LIDAR output signals, the emitter head being movable relative to the one or more LIDAR chips, and
   the one or more LIDAR chips receive LIDAR input signals that each includes light from one of the head output signals after the light from the one head output signal has been reflected by an object located outside of the LIDAR system.

2. The system of claim 1, wherein at least one of the LIDAR input signals include LIDAR data indicating a distance and/or radial velocity between the one or more LIDAR chips and an object that reflects the at least one LIDAR input signal.

3. The system of claim 1, wherein the one or more LIDAR chips are each configured to generate an electrical signal that indicates a distance and/or radial velocity between the one or more LIDAR chips and an object that reflects the at least one LIDAR input signal.

4. The system of claim 1, wherein optical fibers carry the LIDAR output signals from the one or more LIDAR chips to the emitter head.

5. The system of claim 1, wherein the emitter head includes a beam steering mechanism for changing the direction that the head output signals travel away from the emitter head.

6. The system of claim 5, wherein optical fibers each carries a different one of the LIDAR output signals from the one or more LIDAR chips to the emitter head,
   the beam steering mechanism includes a holder configured to hold the optical fibers,
   the head output signals each exit from a facet of one of the optical fibers, and
   the beam steering mechanism includes one or more lenses that each receives at least one of the head output signals.

7. The system of claim 6, wherein the holder holds the facets of the optical fibers in a linear array.

8. The system of claim 7, wherein the holder is configured to move relative to the one or more lenses and/or the one or more lenses are configured to move relative to the holder.

9. The system of claim 6, wherein the one or more lenses is multiple lenses that each receives at least one of the head output signals.

10. The system of claim 6, wherein the holder and the one or more lenses are positioned on a common platform.

11. The system of claim 10, further comprising:
    an actuator configured to rotate the platform around an axis that extends through the platform.

12. The system of claim 10, further comprising:
    an actuator configured to translate the holder relative to the platform.

13. The system of claim 1, further comprising:
    an actuator configured to translate the emitter head.

14. The system of claim 1, further comprising:
    an actuator configured to rotate the emitter head around an axis.

15. The system of claim 14, wherein the axis is spaced apart from the emitter head.

16. The system of claim 1, further comprising:
    electronics configured to operate an actuator so as to move the emitter head relative to the one or more LIDAR chips, the movement of the emitter heading scanning the head output signals to different sample regions in a field of view.

17. The system of claim 16, wherein the electronics are configured to scan the head output signals in a stepping-mode configuration.

18. The system of claim 17, wherein the stepping mode configuration includes re-location segments and data segments, the head output signals being moved between different sample regions during the re-location segments and the head output signals each illuminating a sample region during data segments, the movement of the head output signals being slower during the data segments than during the re-location segments.

19. The system of claim 17, wherein the stepping mode configuration includes re-location segments and data segments, the head output signals being moved between different sample regions during the re-location segments and the head output signals each illuminating a sample region during data segments, the movement of the head output signals is stopped during the data segments.

20. The system of claim 17, wherein emitter head outputs the LIDAR input signals that are received by the one or more LIDAR chips.

* * * * *